(12) United States Patent
Kim et al.

(10) Patent No.: US 12,225,286 B2
(45) Date of Patent: Feb. 11, 2025

(54) LOW POWER SENSOR, PROCESSOR, AND DATA PROCESSING SYSTEM INCLUDING THE SENSOR AND THE PROCESSOR

(71) Applicant: SAMSUNG ELECTRONICS CO., LTD., Suwon-si (KR)

(72) Inventors: Sooyong Kim, Yongin-si (KR); Dongook Chung, Seoul (KR); Junho Huh, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 230 days.

(21) Appl. No.: 17/730,616

(22) Filed: Apr. 27, 2022

(65) Prior Publication Data

US 2022/0353411 A1 Nov. 3, 2022

(30) Foreign Application Priority Data

Apr. 30, 2021 (KR) ........................ 10-2021-0056872

(51) Int. Cl.
*H04N 23/60* (2023.01)
*G06T 7/20* (2017.01)
*H04N 23/611* (2023.01)
*H04N 23/65* (2023.01)
*H04N 23/667* (2023.01)

(52) U.S. Cl.
CPC ............. *H04N 23/665* (2023.01); *G06T 7/20* (2013.01); *H04N 23/611* (2023.01); *H04N 23/65* (2023.01); *H04N 23/667* (2023.01); *G06T 2207/30201* (2013.01)

(58) Field of Classification Search
CPC .... H04N 23/665; H04N 23/611; H04N 23/65; H04N 23/667; H04N 23/45; H04N 23/6811; H04N 23/651; H04N 7/188; H04N 7/183; G06T 7/20; G06T 2207/30201; G06F 1/3234; G06F 3/017; G06F 21/32; G06V 40/16; G06V 40/20; H02J 7/35; H02J 9/005; Y02E 10/50; Y02E 70/30

See application file for complete search history.

(56) References Cited

U.S. PATENT DOCUMENTS

| | | |
|---|---|---|
| 7,773,781 B2 | 8/2010 | Kim |
| 8,428,205 B2 | 4/2013 | Chang et al. |
| 8,832,719 B1 | 9/2014 | Huang et al. |

(Continued)

FOREIGN PATENT DOCUMENTS

| | | |
|---|---|---|
| JP | 2012060291 A | 3/2012 |
| KR | 100580626 | 5/2006 |

(Continued)

*Primary Examiner* — Lin Ye
*Assistant Examiner* — Tuan H Le
(74) *Attorney, Agent, or Firm* — Fish & Richardson P.C.

(57) ABSTRACT

A sensor includes a control circuit set to a first operation mode in which an operation is prepared by receiving a clock signal from a processor and receiving an operation command from the processor. The sensor is configured to generate a first signal including a result of an operation corresponding to the operation command and a second signal indicating completion of the operation. An interface circuit is configured to transmit the first signal and the second signal to the processor. The control circuit is set to a second operation mode due to blocking of the clock signal by a control of the processor in response to the transmission of the second signal.

11 Claims, 18 Drawing Sheets

(56) References Cited

U.S. PATENT DOCUMENTS

| | | |
|---|---|---|
| 9,538,087 B2 | 1/2017 | Choi et al. |
| 9,661,221 B2 | 5/2017 | Sadasivam et al. |
| 10,031,870 B2 | 6/2018 | Nagase et al. |
| 10,375,308 B2 | 8/2019 | Cho et al. |
| 10,638,041 B2 | 4/2020 | Kim et al. |
| 2008/0175447 A1 | 7/2008 | Kim et al. |
| 2016/0034019 A1 | 2/2016 | Seo et al. |
| 2016/0080652 A1* | 3/2016 | Shirota ................ G06K 7/1404 348/222.1 |
| 2018/0041736 A1* | 2/2018 | Gagnon ............... H04N 23/651 |
| 2019/0041936 A1 | 2/2019 | Teoh et al. |
| 2020/0120199 A1 | 4/2020 | Maeng et al. |
| 2020/0159305 A1 | 5/2020 | Bartscherer et al. |
| 2020/0242066 A1 | 7/2020 | Lee et al. |

FOREIGN PATENT DOCUMENTS

| | | |
|---|---|---|
| KR | 101330636 | 11/2013 |
| KR | 101541020 | 7/2015 |
| KR | 101826189 | 2/2018 |
| KR | 1020180023197 | 3/2018 |
| KR | 101971736 | 4/2019 |
| KR | 1020190099170 | 8/2019 |
| KR | 102109889 | 6/2020 |

\* cited by examiner

LOW POWER SENSOR, PROCESSOR, AND DATA PROCESSING SYSTEM INCLUDING THE SENSOR AND THE PROCESSOR

CROSS-REFERENCE TO RELATED APPLICATION

This application is based on and claims priority under 35 U.S.C. § 119 to Korean Patent Application No. 10-2021-0056872, filed on Apr. 30, 2021, in the Korean Intellectual Property Office, the disclosure of which is incorporated by reference herein in its entirety.

BACKGROUND

The disclosure relates to a sensor, and more particularly, to a sensor implemented at low power, a processor, and a data processing system including the sensor and the processor.

Terminals including an image processing device may maintain a screen lock status for user authentication, etc. In this case, as a method of releasing a screen lock, a user interface, for example, a slide lock release screen may be provided. When a user gesture is input, the screen lock may be released.

As another method, the screen lock may be released by recognizing a user near a device. The terminals may sense whether a movement occurs near the device, detect a face from an external image, and perform face recognition of whether the detected face matches a registered user face. When matching occurs, the screen lock may be released.

To this end, the terminals may need to operate even when a camera module has not been activated by the user. In other words, because the camera module needs to operate all the time, power consumption of the camera module may be significant. Thus, operations described above need to be implemented at low power.

SUMMARY

The disclosure provides a sensor implemented at low power by controlling a clock signal and a power signal provided thereto, a processor, and a data processing system including the sensor and the processor.

According to an aspect of the disclosure, there is provided a sensor including a control circuit set to a first operation mode in which an operation is prepared by receiving a clock signal from a processor and receiving an operation command from the processor. The control circuit is configured to generate a first signal including a result of an operation corresponding to the operation command and a second signal indicating completion of the operation. An interface circuit is configured to transmit the first signal and the second signal to the processor. The control circuit is set to a second operation mode due to not receiving the clock signal, which is discontinued by control of the processor in response to the transmission of the second signal.

According to another aspect of the disclosure, there is provided a processor including a controller receiving a clock signal from outside. The controller is configured to generate an operation command. An interface circuit provides the clock signal and the operation command to a sensor. As a response to the operation command, the interface circuit receives from the sensor at least one of a first signal including a result of an operation corresponding to the operation command and a second signal indicating completion of the operation. The controller is configured to discontinue the clock signal provided to the sensor, based on at least one of the first signal and the second signal.

According to another aspect of the disclosure, there is provided a data processing system including a sensor configured to perform a motion detection operation or a face detection operation based on an operation command. The sensor generates a first signal when an operation of the motion detection operation or the face detection operation is completed. An oscillator is configured to generate a clock source signal that is a basis of a clock signal provided to the sensor. A processor includes a clock generator configured to generate the clock signal by using the clock source signal received from the oscillator. The processor receives the first signal from the sensor and controls the clock generator to block the clock signal provided to the sensor based on the first signal.

BRIEF DESCRIPTION I/F THE DRAWINGS

Embodiments of the disclosure will be more clearly understood from the following detailed description taken in conjunction with the accompanying drawings in which.

DETAILED DESCRIPTION I/F THE EMBODIMENTS

Hereinafter, embodiments of the disclosure will be described in detail with reference to the accompanying drawings.

Figure 1:
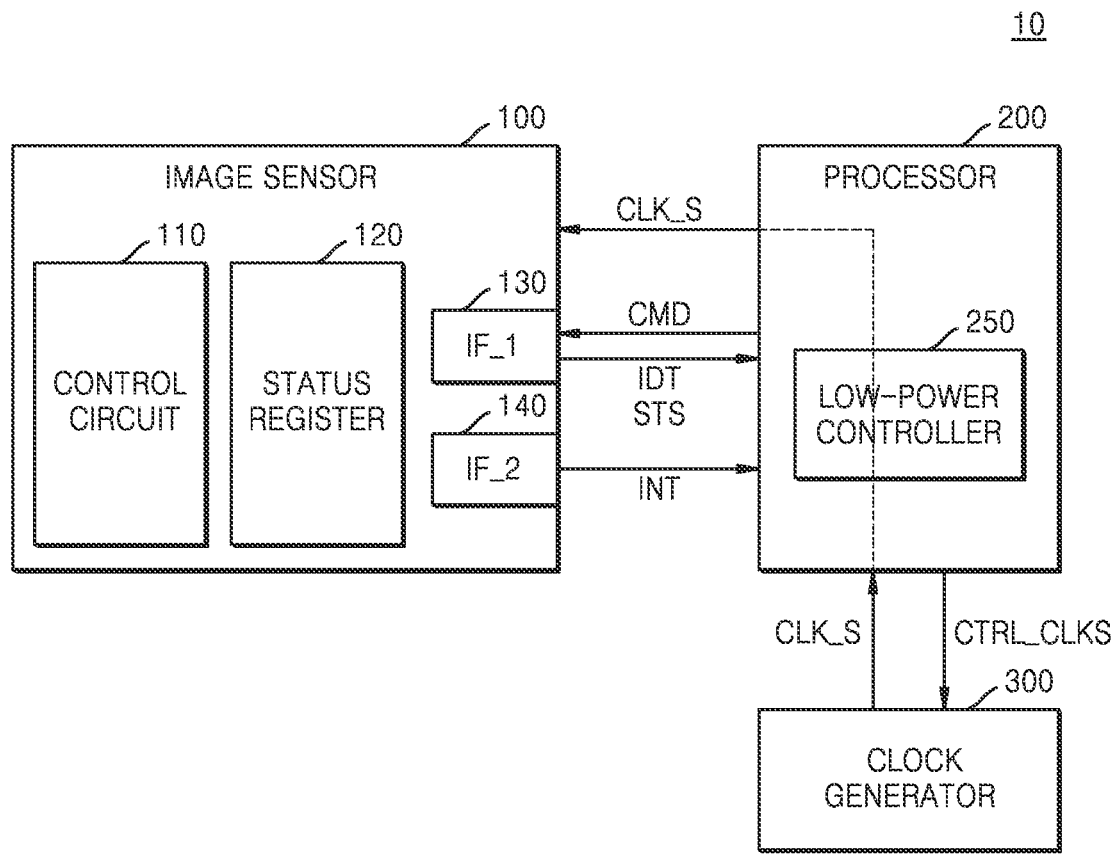
FIG. 1 is a block diagram of an image processing device according to an example embodiment.

FIG. 1 is a block diagram of an image processing device 10 according to an example embodiment. The image processing device 10 may be implemented by an electronic device which shoots an image, displays the shot image, or performs an operation based on the shot image. The image processing device 10 may be implemented as, for example, a personal computer (PC), an Internet of Things (IoT) device, or a portable electronic device. The portable electronic device may include a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, etc. In addition, the image processing device 10 may be mounted as a component in electronic equipment, such as a drone and an advanced drivers assistance system (ADAS), or a vehicle, furniture, manufacturing facilities, doors, various measurement equipment, etc.

Referring to FIG. 1, the image processing device 10 may include an image sensor 100, a processor 200, and a clock generator 300. The image processing device 10 may further include other components not shown, such as a display, a user interface, and a power management integrated circuit (PMIC). For example, the clock generator 300 may further include an oscillator generating a clock source signal.

The image sensor 100 may convert an optical signal of an object, which is incident through an optical lens, into an electrical signal and generate and output image data IDT based on the electrical signal. The image sensor 100 may include, for example, a pixel array including a plurality of pixels arranged in two dimensions and a read-out circuit, and the pixel array may convert received optical signals into electrical signals. The pixel array may be implemented as a photoelectric conversion element, for example, a charge coupled device (CCD) or a complementary metal oxide semiconductor (CMOS) and may be implemented as various types of photoelectric conversion elements. The read-out circuit may generate raw data based on the electrical signal provided by the pixel array and may output, as image data IDT, the raw data or the raw data on which a pre-processing, such as bad pixel elimination, has been performed. The image sensor 100 may be implemented as a semiconductor chip or a semiconductor package including the pixel array and the read-out circuit.

According to an example embodiment, the image sensor 100 may include a dynamic vision sensor (DVS), and in this case, may output the image data IDT only when there is a change in pixel units.

The image sensor 100 may include a control circuit 110, a status register 120, a first interface circuit (I/F_1) 130, and a second interface circuit (I/F_2) 140. The control circuit 110 may control the overall operation of the image sensor 100. For example, when a command CMD is received from the processor 200, a series of operations according to the command CMD may be performed. In an embodiment, the control circuit 110 may perform an operation of detecting a movement of an object, when a motion detection command (for example, CMD_MD in FIG. 3) is received from the processor 200. The control circuit 110 may generate an indication of whether there has been a movement of the object as data and store the generated data in a memory (not illustrated). The motion detection operation may be performed repeatedly according to a certain period and may be continued until a stop command is received from the processor 200. In an embodiment, the control circuit 110 may shoot an object and generate the image data IDT, when a face detection command (for example, CMD_FD in FIG. 6) is received from the processor 200. The face detection command may be performed repeatedly for a certain number of times.

The control circuit 110 may generate the image data IDT by using a result of a series of operations and may generate status information STS after a status of the image sensor 100 according to the operations is identified. The status information STS may mean various flags indicating statuses of the image sensor 100. For example, the status information STS may indicate a status in which the image sensor 100 is in operation due to a first command, a status in which the image sensor 100 is in operation due to a second command, and a status in which the image sensor 100 has terminated an operation, and in addition, the status information STS may indicate a status in which an operation mode of the image sensor 100 is changed. For example, the operation mode of the image sensor 100 may include an active mode, a sleep mode, a power off mode, etc. The active mode may mean a status in which a power signal (for example, PWR_S in FIG. 11) and a clock signal CLK_S have been input and the image sensor 100 is ready to perform an operation, and the sleep mode may mean a status in which only the power signal has been input but the clock signal CLK_S has not been input. The sleep mode may be referred to as an idle mode or a ready mode. In addition, the power off mode may mean a status in which the power signal and the clock signal CLK_S have not been input to the image sensor 100, and the image sensor 100 may additionally include various operation modes.

In addition, the control circuit 110 may generate a signal indicating a change in the status information STS. In an embodiment, the control circuit 110 may generate an interrupt signal INT, when the image sensor 100 has performed an operation according to the first command and completed performing the operation. In an embodiment, the control circuit 110 may generate the interrupt signal INT, when the operation mode of the image sensor 100 is changed from a first operation mode to a second operation mode. For example, when the operation mode of the image sensor 100 is changed from the active mode to the sleep mode, the control circuit 110 may generate the interrupt signal INT. When the control circuit 110 generates the interrupt signal INT in this manner, a change in status information STS of the image sensor 100 may be provided to the processor 200.

The status register 120 may store the status information STS generated by the control circuit 110. The status information STS may be of a flag byte type, but is not limited thereto.

The image sensor 100 may communicate with the processor 200 via the IF_1 and IF_2 130 and 140. For example, the IF_1 and IF_2 130 and 140 may communicate with the processor 200 based on a communication protocol such as serial peripheral interface (SPI), inter-integrated circuit (I2C), improved inter-integrated circuit (I3C), and general purpose input/output (GPIO). In an embodiment, different communication protocols from each other may be applied to the IF_1 and IF_2 130 and 140. For example, a protocol based on the I2C may be applied to the IF_1 130 and a protocol based on the GPIO may be applied to the IF_2 140.

The image sensor 100 may receive the command CMD from the processor 200 via the IF_1 130 and may transmit to the processor 200 the image data IDT and/or the status information STS, which have been generated as a result of an operation according to the command CMD. In addition, the image sensor 100 may transmit, to the processor 200, the interrupt signal INT via the IF_2 140.

The processor 200 may control the overall operation of the image processing device 10 and may control components of the image processing device 10, for example, the image sensor 100 and the clock generator 300.

The processor 200 may control the clock generator 300 and then control generation of the clock signal CLK_S, which is provided to the image sensor 100, and may control the overall operation of the image sensor 100. The processor 200 may provide the command CMD to the image sensor 100 and may detect a movement of an object based on the received data as a result or detect a face of an object.

For example, the processor 200 may control the image processing device 10 to operate in an always on camera (AoC) mode in which a shootable status is maintained. The AoC mode may mean a mode in which the image sensor 100 is maintained at a turn-on status so that the image processing device 10 may always capture images. In the AoC mode, the processor 200 may operate the image sensor 100 for shooting even during a status in which a display (not illustrated) or the user interface (not illustrated) of the image processing device 10 is not activated.

The processor 200 may control various functions of the image processing device 10 based on the captured image. In an embodiment, the processor 200 may release the screen lock of the image processing device 10 based on images. The processor 200 may detect whether a movement occurs outside the image processing device 10 by using the image sensor 100. To this end, the image sensor 100 may perform the motion detection operation periodically and repeatedly. When a motion detection succeeds, the face detection operation may be performed. The image sensor 100 may generate the image data IDT by periodically capturing images, and the processor 200 may detect a face included in the image data IDT by using the image data IDT. When a face detection succeeds, the face recognition operation may be performed. When the image sensor 100 provides the image data IDT to the processor 200, the processor 200 may determine whether the detected face is a face registered in the image processing device 10. When the face detection fails, the processor 200 may repeatedly perform the face detection operation for a certain number of times. The processor 200 may perform the face detection operation for the certain number of times and, when the face detection finally fails, may perform the motion detection operation again. In the AoC mode, the image sensor 100 may perform the motion detection operation and the face detection operation according to a certain period.

The processor 200 may include a low-power controller 250. The low-power controller 250 may control generation of the clock signal CLK_S provided to the image sensor 100 so that the image sensor 100 operating in the AoC mode may implement low power. The low-power controller 250 may transmit a clock control signal CTRL_CLKS to the clock generator 300, based on the image data IDT, the status information STS, and the interrupt signal INT, which are received from the image sensor 100. In an embodiment, the low-power controller 250 may block the clock signal CLK_S provided to the image sensor 100, by setting the clock control signal CTRL_CLKS at a first level, and may provide the clock signal CLK_S to the image sensor 100, by setting the clock control signal CTRL_CLKS at a second level.

The processor 200 may be implemented as a single semiconductor chip or a plurality of semiconductor chips. The processor 200 may include a central processing unit (CPU), a microprocessor, an advanced reduced instruction set computer (RISC) machine (ARM) processor, an X86 processor, a microprocessor without interlocked pipeline stages (MIPS) processor, a graphics processing unit (GPU), a general GPU, or a certain other processor configured to perform program commands stored in a memory.

The clock generator 300 may generate the clock signal CLK_S provided to the image sensor 100. The clock generator 300 may also generate various clock signals used by the image processing device 10. For example, the clock generator 300 may also generate a clock signal provided to the processor 200.

The clock signal CLK_S generated by the clock generator 300 may be provided to the image sensor 100 via the processor 200. The clock generator 300 may generate the clock signal CLK_S provided to the image sensor 100 in response to the clock control signal CTRL_CLKS of the processor 200. In an embodiment, the clock generator 300 may terminate generation of the clock signal CLK_S or may not transmit the clock signal CLK_S to the processor 200, according to the clock control signal CTRL_CLKS of the first level. In addition, the clock generator 300 may generate the clock signal CLK_S and transmit the clock signal CLK_S to the processor 200, according to the clock control signal CTRL_CLKS of the second level.

In FIG. 1, the clock generator 300 is illustrated as a separate component from the processor 200, but is not limited thereto, and in an embodiment, the clock generator 300 may be equipped inside the processor 200.

The image processing device 10 may further include an oscillator generating a clock source signal, which is a basis of the clock signal CLK_S. The oscillator may include a crystal oscillator. In an embodiment, the oscillator may be equipped outside the image sensor 100 and the processor 200. In an embodiment, the oscillator may provide the clock source signal to the clock generator 300 equipped inside the processor 200. The clock generator 300 may generate the clock signal CLK_S based on the clock source signal.

According to a comparative example, when an image processing device operates in an AoC mode, because an image sensor needs to maintain a sensing operation, the clock signal CLK_S may be continuously provided to the image sensor. In addition, even when the image sensor completes an operation earlier than a certain period, because a processor may not know of an operation completion of the image sensor, the processor may provide a clock signal to a sensor until the certain period is over. Accordingly, in the image sensor, consumed power due to toggling of the clock signal may be increased.

However, according to an embodiment, when the sensing operation of the image sensor 100 is completed, the image sensor 100 may generate the interrupt signal INT and provide the interrupt signal INT to the processor 200, and the processor 200 may block the clock signal CLK_S provided to the image sensor 100 in response to the interrupt signal INT. In addition, when the image data IDT is received from the image sensor 100 according to the command CMD, the processor 200 may consider the operation of the image sensor 100 to be completed and may block the clock signal CLK_S provided to the image sensor 100. In this manner, the image processing device 10 operating with low power may be implemented.

On the other hand, in the disclosure, it is described that the image sensor 100 performs the motion detection operation, but a subject performing the motion detection operation may not necessarily be limited to the image sensor. The subject performing the motion detection operation may be another sensor capable of sensing a movement of the object and, for example, at least one of an inertia measurement unit (IMU)

using an accelerometer and an angular speedometer, a photoresistor sensor, and a voice sensor may perform the motion detection operation.

Figure 2:
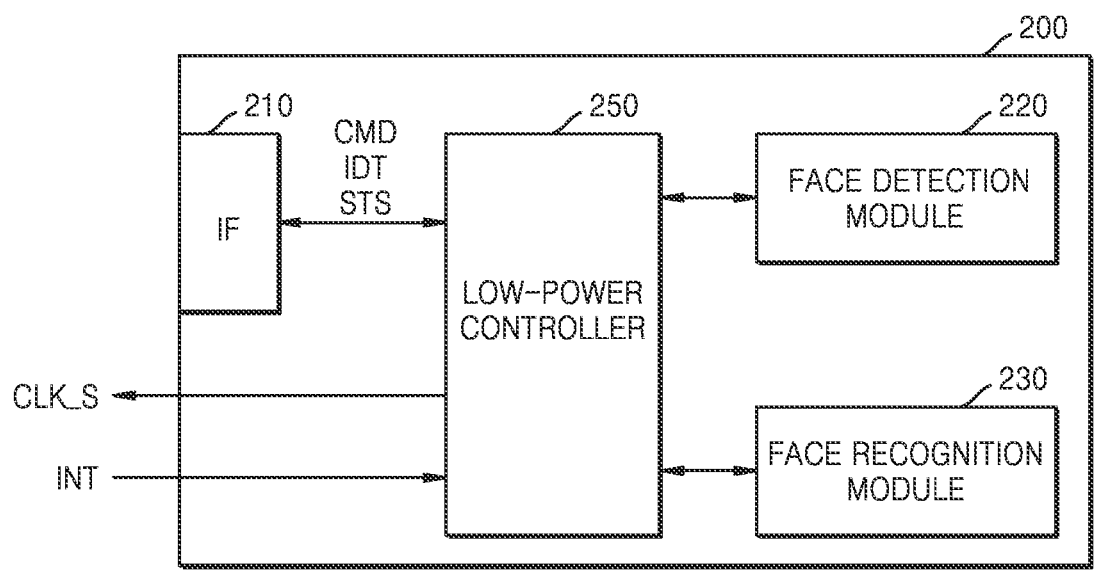
FIG. 2 is a block diagram of a processor according to an example embodiment.

FIG. 2 is a block diagram illustrating the processor 200 according to an example embodiment.

Referring to FIG. 2, the processor 200 may include an interface circuit (I/F) 210, a face detection module 220, a face recognition module 230, and the low-power controller 250.

The processor 200 may transmit the command CMD to the image sensor (100 in FIG. 1) via the I/F 210, and may receive the image data IDT and the status information STS from the image sensor 100. A communication protocol corresponding to the IF_1 130 of the image sensor 100 may be applied to the I/F 210.

The face detection module 220 and the face recognition module 230 may operate based on a face detection algorithm and a face recognition algorithm, respectively. For example, the face detection algorithm may include a knowledge-based method, a feature-based method, a template-matching method, an appearance-based method, etc. In addition, examples of the face recognition algorithm may include principal component analysis (PCA), fisher discriminant analysis (FDA), independent component analysis (ICA), scale invariant feature transform (SIFT), a speeded up robust features (SURF), etc. However, the face detection algorithm and the face recognition algorithm are not limited thereto.

The face detection module 220 may generate the face detection command and receive the image data IDT from the image sensor 100. A face may be detected from the received image data IDT. According to the face detection command, the face detection operation may be performed periodically for a number of times.

When the face detection operation succeeds, the face recognition module 230 may perform face recognition by using the corresponding image data IDT.

When the motion detection operation has preceded and a motion has been detected, the face detection module 220 may perform the face detection operation, and when a face has been detected, the face recognition module 230 may perform the face recognition operation.

The low-power controller 250 may provide the clock signal CLK_S to the image sensor 100 for low-power driving of the image sensor 100. To this end, the interrupt signal INT may be received from the image sensor 100, and based on the interrupt signal INT, provision of the clock signal CLK_S to the image sensor 100 may be controlled.

On the other hand, to receive the interrupt signal INT, the processor 200 may include a separate interface circuit corresponding to the second interface circuit 140 of the image sensor 100. The interface circuit may include, for example, GPIO. The image processing device 10 may sequentially perform the motion detection operation, the face detection operation, and the face recognition operation. Below, each operation will be individually described.

Figure 3:
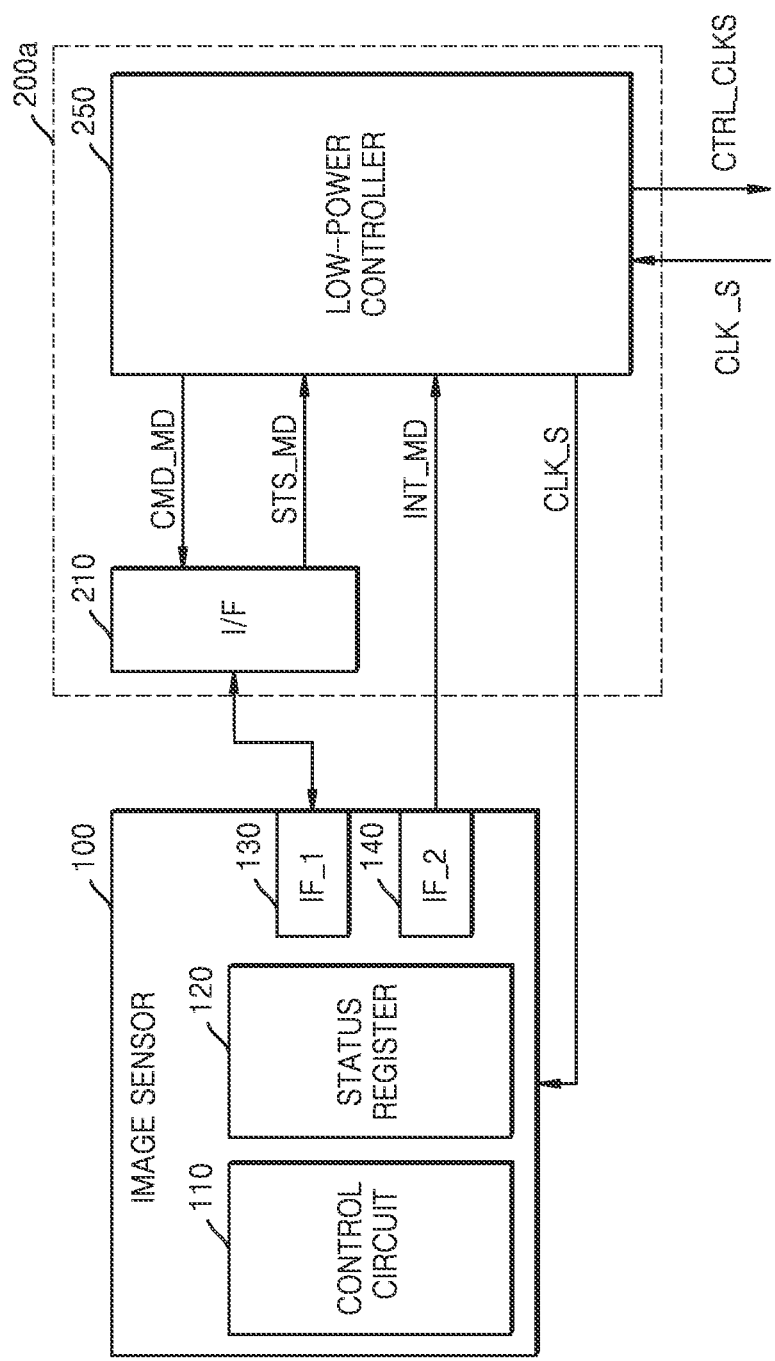
FIG. 3 is a conceptual diagram of a motion detection operation of a processor, according to an example embodiment.

FIG. 3 is a conceptual diagram of a motion detection operation of a processor 200a, according to an example embodiment. The processor 200a in FIG. 3 may perform the motion detection operation.

Referring to FIG. 3, the low-power controller 250 may provide the clock signal CLK_S to the image sensor 100 for operating the image sensor 100. In addition, the low-power controller 250 may control generation of the clock signal CLK_S provided to the image sensor 100, by providing the clock control signal CTRL_CLKS to the clock generator 300. In this manner, the low-power controller 250 may control the image sensor 100 to operate with low power. The clock signal CLK_S may be received from the clock generator 300.

In addition, the low-power controller 250 may generate a motion detection command CMD_MD for performing the motion detection operation and provide the motion detection command CMD_MD to the image sensor 100 via the I/F 210. The image sensor 100 may perform the motion detection operation in response to the received motion detection command CMD_MD. When the motion detection operation is completed, the image sensor 100 may generate a first interrupt signal INT_MD and provide the first interrupt signal INT_MD to the processor 200. The processor 200 may read a first status information STS_MD stored in the status register 120 of the image sensor 100, by receiving the first interrupt signal INT_MD. The first status information STS_MD may include information about whether a motion detection has been made. The first status information STS_MD may be provided to the low-power controller 250 via the I/F 210. In an embodiment, when the first interrupt signal INT_MD is received, the processor 200 may request status information from the image sensor 100 and the image sensor 100 may transmit the first status information STS_MD stored in the status register 120 to the processor 200 in response to a request of the low-power controller 250.

Because the first interrupt signal INT_MD means completion of the motion detection operation of the image sensor 100, the low-power controller 250 may block the clock signal CLK_S provided to the image sensor 100 by receiving the first interrupt signal INT_MD. The low-power controller 250 may stop generation of the clock signal CLK_S by transmitting the clock control signal CTRL_CLKS of the first level to the clock generator 300, which generates the clock signal CLK_S.

When the image processing device 10 operates in the AoC mode, the motion detection operation may be repeatedly performed. Accordingly, signals described above may be repeatedly generated in every period in which the motion detection operation is performed.

Figure 4:
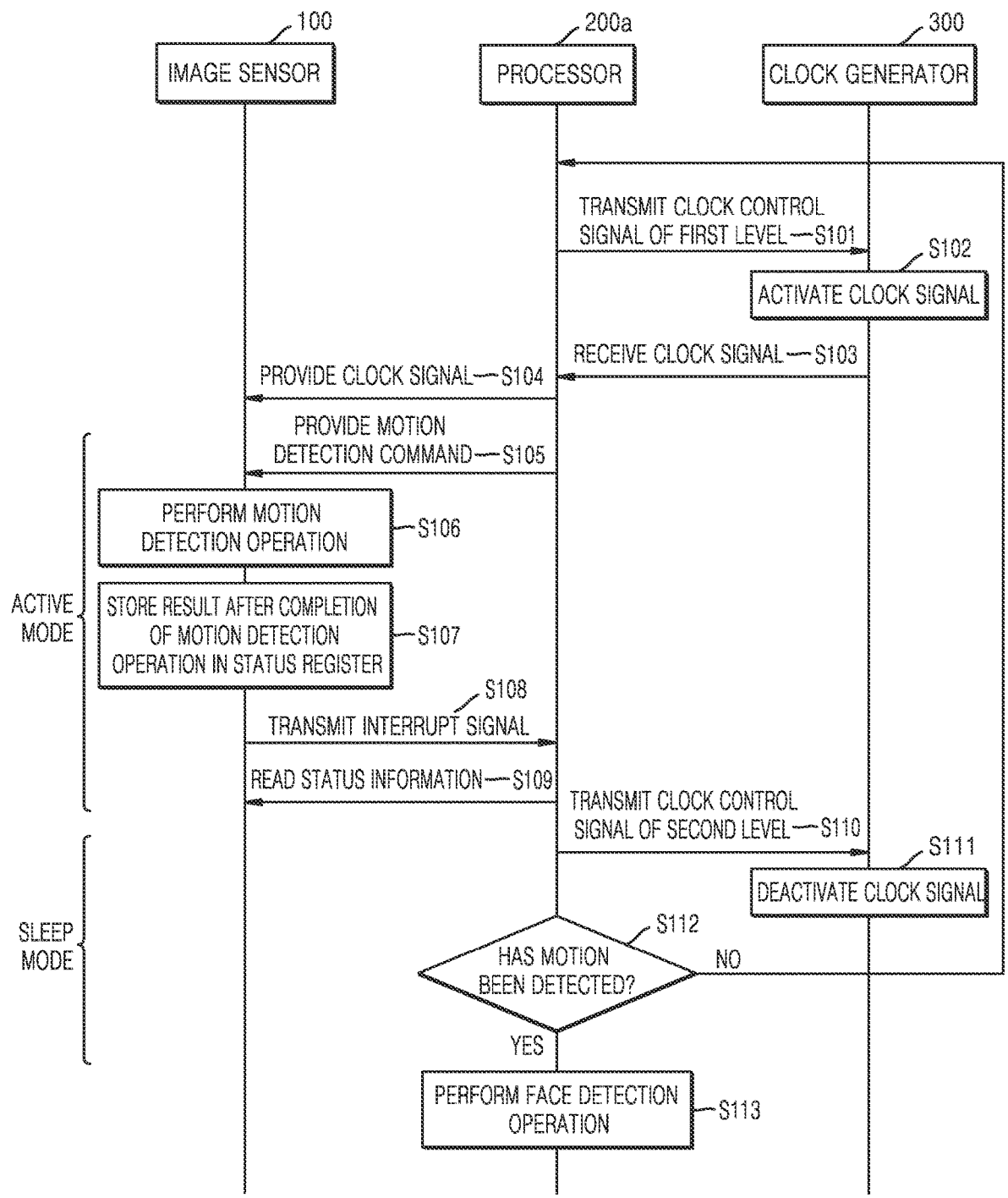
FIG. 4 is a flowchart of an operation of an image processing device, according to an example embodiment.
Figure 5:
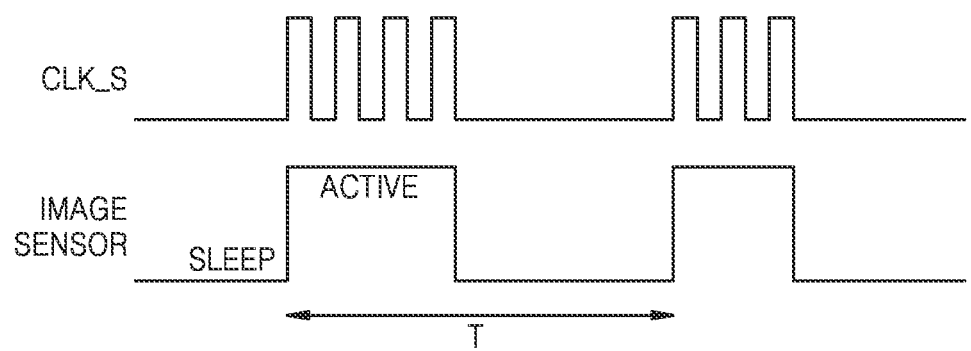
FIG. 5 is a timing diagram of an operation mode of an image sensor, according to an example embodiment.

FIG. 4 is a flowchart of an operation of an image processing device, according to an example embodiment, and FIG. 5 is a timing diagram of an operation mode of the image sensor 100, according to an example embodiment. The image processing device may correspond to the image processing device 10 of FIG. 1 and may perform the motion detection operation.

Referring to FIGS. 3 and 4, the processor 200a may transmit the clock control signal CTRL_CLKS of the first level to the clock generator 300 (S101). In this manner, the clock generator 300 may activate the clock signal CLK_S by generating the clock signal CLK_S (S102). For example, the first level may be a logic high level. The image sensor 100 may be in a state in which the image sensor 100 has been activated ahead of operation S101.

The processor 200a may receive the clock signal CLK_S from the clock generator 300 (S103) and may provide the clock signal CLK_S to the image sensor 100 (S104). For example, the clock signal CLK_S may be provided to the image sensor 100 via the low-power controller 250.

In this case, referring to FIG. 5, when the clock signal CLK_S is provided, the operation mode of the image sensor 100 may be changed from the sleep mode to the active mode. Thereafter, the image sensor 100 may operate in the active mode until the clock signal CLK_S is stopped.

Referring to FIG. 4 again, to perform the motion detection operation, the processor 200a may generate the motion detection command CMD_MD and provide the motion detection command CMD_MD to the image sensor 100 (S105). The processor 200a may estimate the time during which the image sensor 100 performs the motion detection operation. A period T of the motion detection operation based on the estimated time may be determined.

The image sensor 100 may perform the motion detection operation in response to the motion detection command CMD_MD (S106). In an embodiment, when the image sensor 100 includes a complementary metal-oxide semiconductor (CMOS) sensor, the image sensor 100 may generate the image data IDT and detect a movement of an object by using a motion detection algorithm. In an embodiment, when the image sensor 100 includes a DVS, the image sensor 100 may perform the motion detection operation by sensing an occurrence of an event according to a change of light.

When the motion detection operation is completed, the image sensor 100 may store a motion detection result in the status register 120 (S107). The first status information STS_MD stored in the status register 120 may include the motion detection result and the operation mode of the image sensor 100.

On the other hand, the image sensor 100 may complete an operation earlier than the time that has been previously estimated by the processor 200a. For example, an operation time of the image sensor 100 may vary according to a surrounding environment. For example, the time required for the motion detection in an environment of a sufficient amount of light may be relatively shorter than the time required for the motion detection in an environment of an insufficient amount of light.

When the motion detection operation is terminated, the image sensor 100 may generate the first interrupt signal INT_MD and transmit the generated first interrupt signal INT_MD to the processor 200a (S108). The first interrupt signal INT_MD may be used to inform the processor 200a of a termination of the operation of the image sensor 100. The processor 200a may determine that the operation of the image sensor 100 has been terminated by receiving the first interrupt signal INT_MD, regardless of the pre-estimated time.

The processor 200a may read the first status information STS_MD stored in the image sensor 100 in response to the first interrupt signal INT_MD (S109) and may transmit the clock control signal CTRL_CLKS of the second level to the clock generator 300 (S110). For example, the second level may be logic low level. The clock generator 300 may deactivate the clock signal CLK_S in response to the clock control signal CTRL_CLKS of the second level (S111).

Referring to FIG. 5, when the clock signal CLK_S is blocked, the operation mode of the image sensor 100 may set from the active mode to the sleep mode. Thereafter, the image sensor 100 may maintain the sleep mode until the clock signal CLK_S is provided again.

Referring to FIG. 4 again, the processor 200a may identify whether the motion detection has been made based on the received first status information STS_MD (S112). When the motion detection has been detected, the face detection operation, as a next operation, may be performed (S113); but when the motion detection has not been made, operation S101 may be performed again. On the other hand, the motion detection operation described with reference to FIG. 4 may be repeatedly performed according to the period T.

According to an embodiment, the image sensor 100 may receive the clock signal CLK_S only in the active mode in which an operation of the image sensor 100 is performed, but may not receive the clock signal CLK_S in the sleep mode thereof, and thus, power consumption due to the clock signal CLK_S may be reduced.

Although it is described in the disclosure that the image sensor 100 directly performs the motion detection operation, the processor 200a may perform the motion detection operation when the image sensor 100 provides the image data IDT to the processor 200a. In this case, when the image sensor 100 transmits the image data IDT to the processor 200a, the processor 200a may determine that the operation of the image sensor 100 has been completed+ and may block the clock signal CLK_S.

Figure 6:
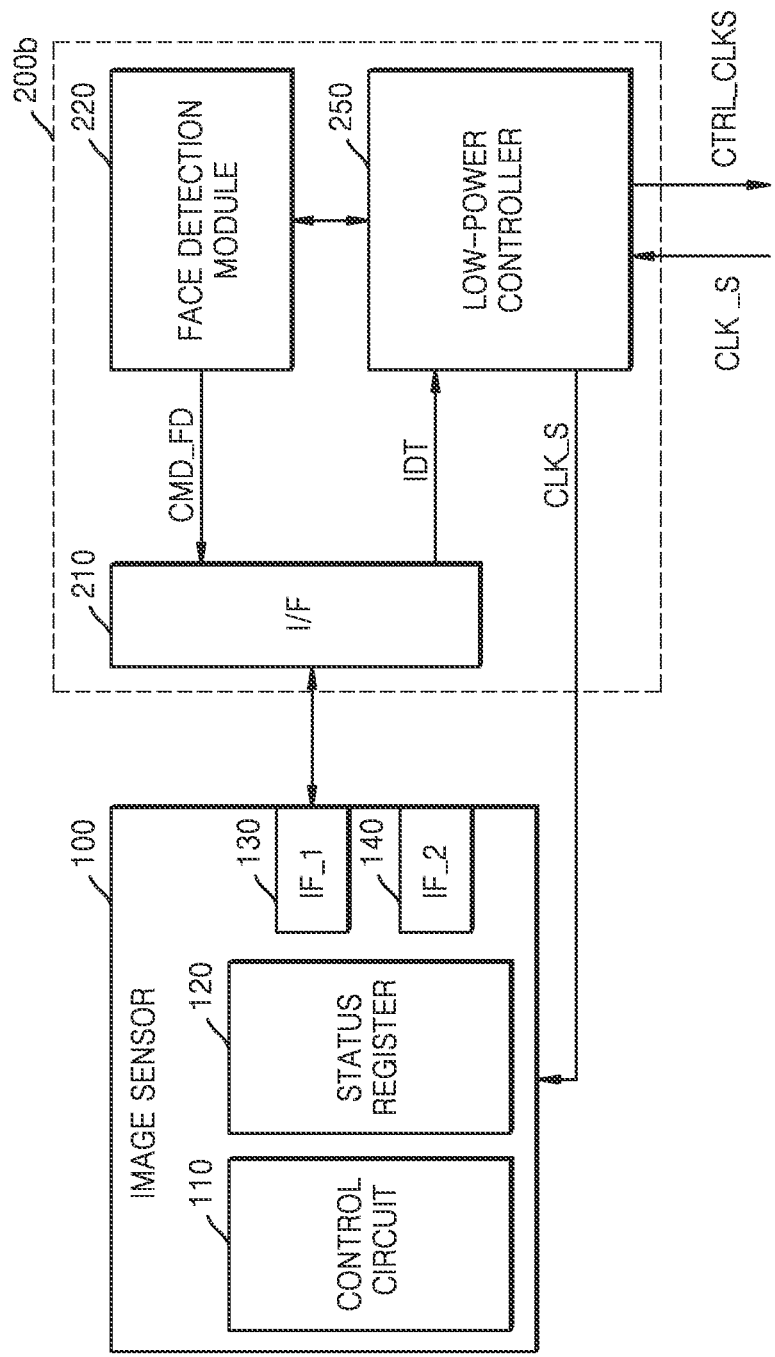
FIG. 6 is a conceptual diagram of a face detection operation of a processor, according to an example embodiment.

FIG. 6 is a conceptual diagram of a face detection operation of a processor 200b, according to an example embodiment. The processor 200b in FIG. 6 may perform the face detection operation when the motion detection operation succeeds.

Referring to FIG. 6, the low-power controller 250 may provide the clock signal CLK_S for operating the image sensor 100. In addition, the low-power controller 250 may control the clock signal CLK_S provided to the image sensor 100 by using the clock control signal CTRL_CLKS. In this manner, the image sensor 100 may be controlled to operate with low power. The clock signal CLK_S may be received from the clock generator 300.

The face detection module 220 may be provide a face detection command CMD_FD to the interface circuit 210 for performing the face detection operation. Thereafter, in response to the face detection command CMD_FD, the image sensor 100 may generate the image data IDT and provide the image data IDT to the low-power controller 250 via the I/F 210.

Because the face detection operation may be performed by the processor 200b, the image sensor 100 may terminate an operation by transmitting the image data IDT. Thus, the low-power controller 250 may receive the image data IDT and block the clock signal CLK_S that is provided to the image sensor 100. Generation of the clock signal CLK_S may be blocked by transmitting the clock control signal CTRL_CLKS of the first level to the clock generator 300, which generates the clock signal CLK_S.

Figure 7:
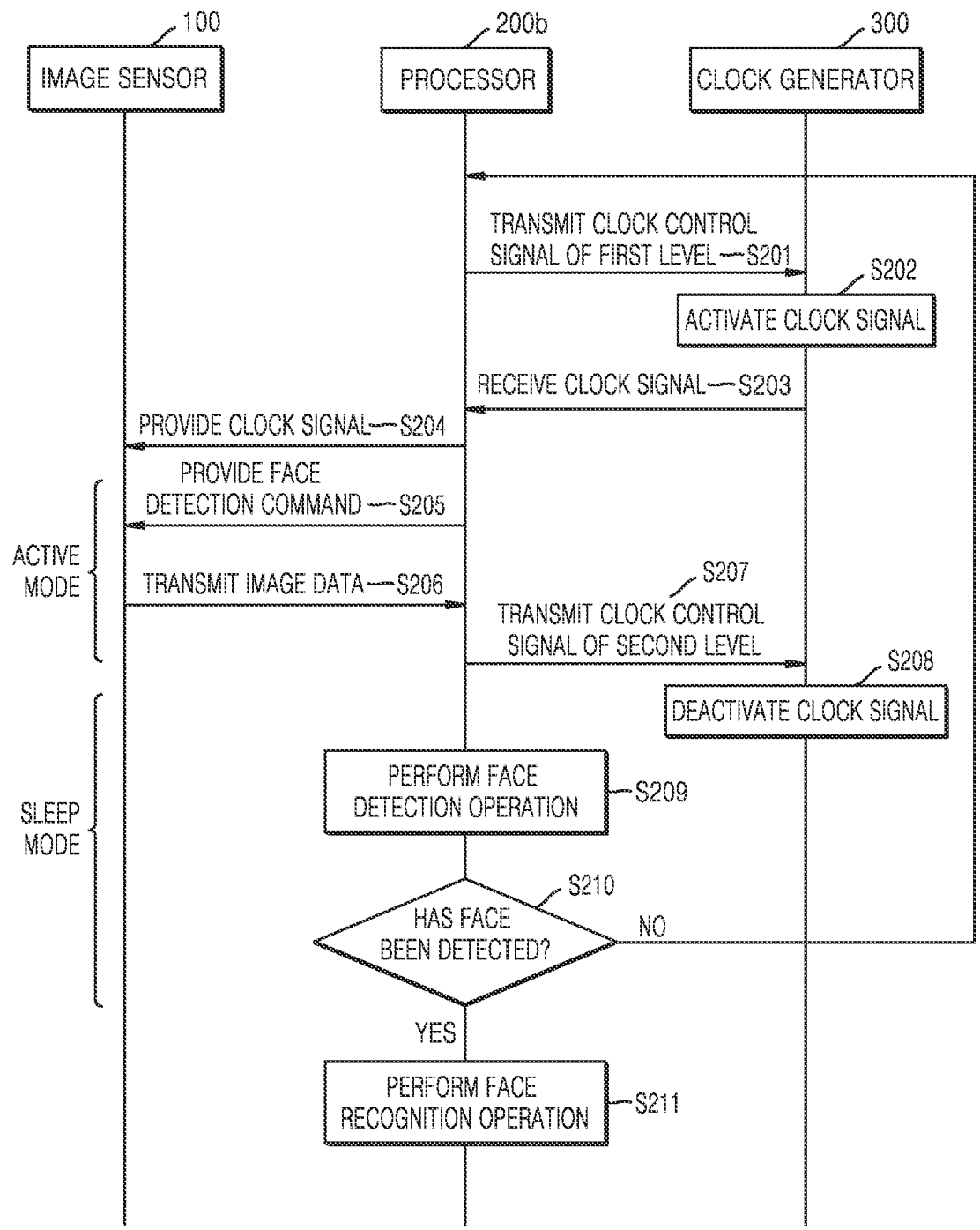
FIG. 7 is a flowchart of an operation of an image processing device, according to an example embodiment.

FIG. 7 is a flowchart of an operation of an image processing device, according to an example embodiment. Operations in FIG. 7 may include the face detection operation corresponding to operation S111 in FIG. 4.

Referring to FIG. 7, the processor 200b may transmit the clock control signal CTRL_CLKS of the first level to the clock generator 300 (S201). For example, the first level may be logic high level. In this manner, the clock generator 300 may activate the clock signal CLK_S (S202).

The processor 200b may receive the clock signal CLK_S from the clock generator 300 (S203) and may provide the clock signal CLK_S to the image sensor 100 (S204). For example, the clock signal CLK_S may be provided via the low-power controller 250. When the clock signal CLK_S is provided to the image sensor 100, the operation mode of the image sensor 100 may be set to the active mode.

To perform the face detection operation, the processor 200b may generate the face detection command CMD_FD and provide the face detection command CMD_FD to the image sensor 100 (S205). For example, the face detection module 220 may generate the face detection command CMD_FD. The image sensor 100 may generate the image data IDT and transmit the image data IDT to the processor 200b in response to the face detection command CMD_FD.

The processor 200b may estimate the time required by the image sensor 100 to generate the image data IDT. In this case, by receiving the image data IDT, the processor 200b may determine that the operation of the image sensor 100 has been terminated regardless of the estimated time. Accordingly, thereafter, to block the clock signal CLK_S provided to the image sensor 100, the clock control signal CTRL_CLKS of the second level may be transmitted to the clock generator 300 (S207). For example, the second level may be logic low level. The clock generator 300 may deactivate the clock signal CLK_S (S208). When provision of the clock signal CLK_S is blocked, the operation mode of the image sensor 100 may be changed to the sleep mode.

The processor 200b may perform the face detection operation based on the received image data IDT (S209). An algorithm used for the face detection operation is not limited to any algorithm. When a face is detected (S210), the face recognition operation may be performed (S211), and when a face is not detected (S210), operation S201 may be performed again.

On the other hand, when face detection fails, the processor 200b may perform operations S201 through S210 repeatedly for a certain critical number of times. When the critical number of times is exceeded, the motion detection operations in FIG. 4 may be performed.

FIG. 7 discloses that the processor 200b performs the face detection operation, but the image sensor 100 may directly perform the face detection operation for the image data IDT. In this case, the image sensor 100 may provide only the face detection result to the processor 200b. This issue will be described with reference to FIGS. 8 through 10.

Figure 8:
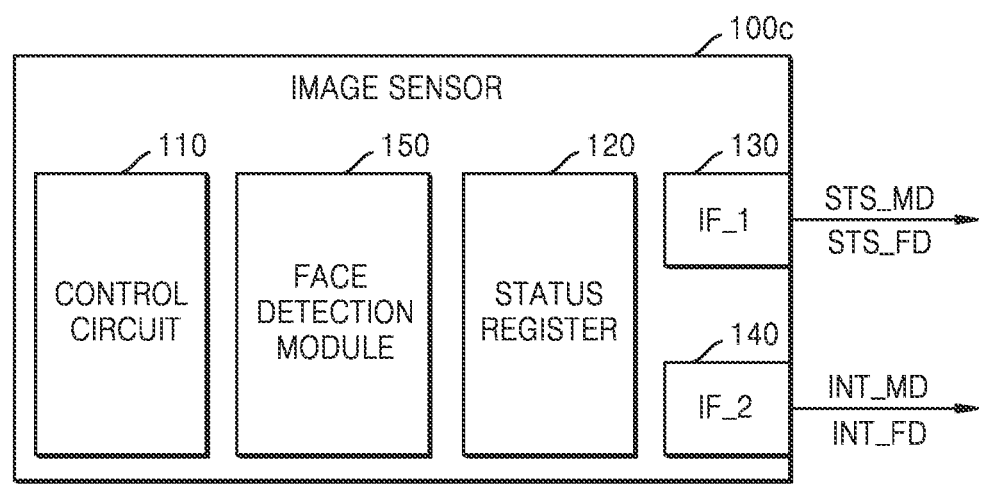
FIG. 8 is a block diagram of an image sensor according to an example embodiment.

FIG. 8 is a block diagram of an image sensor 100c according to an example embodiment.

The image sensor 100c of FIG. 8 may be a modified example of the image sensor 100 in FIG. 1. Accordingly, duplicate descriptions of the image sensor 100 in FIG. 1 will be omitted. The image sensor 100c of FIG. 8 may directly perform not only the motion detection operation but the face detection operation by including a face detection module 150.

Referring to FIG. 8, in an embodiment of the motion detection operation, the control circuit 110 may receive the motion detection command CMD_MD and generate the first status information STS_MD by performing the motion detection operation. The first status information STS_MD may include information about whether the motion detection has been made. In addition, when the motion detection operation is completed, the control circuit 110 may generate the first interrupt signal INT_MD and transmit the first interrupt signal INT_MD to the processor (for example, 200c of FIG. 9) via the second interface circuit 140. Hereinafter, the first status information STS_MD and the first interrupt signal INT_MD may be referred to as being generated by the motion detection operation and second status information STS_FD and a second interrupt signal INT_FD may be referred to as being generated by the face detection operation. Next, the processor 200c may read the first status information STS_MD stored in the status register 120 via the IF_1 130. Next, when the motion detection succeeds, the face detection operation may be performed.

In an embodiment, in the case of the face detection operation, the image sensor 100c may receive the face detection command CMD_FD and the face detection module 150 may generate the second status information STS_FD by using various algorithms. The second status information STS_FD may indicate whether the face detection succeeds. When the face detection operation is completed, the control circuit 110 may generate the second interrupt signal INT_FD and transmit the second interrupt signal INT_FD to the processor 200c via the second interface circuit 140. Next, the processor 200c may read the second status information STS_FD stored in the status register 120 via the IF_1 130. Next, when the motion detection succeeds, the face recognition operation may be performed.

On the other hand, in FIG. 8, it is illustrated that the control circuit 110 performing the motion detection and the face detection module 150 performing the face detection are included inside the image sensor 100c, but the embodiment is not limited thereto. In an embodiment, a circuit performing the motion detection and the face detection module 150 may be included in sensors of different types. For example, the control circuit 110 performing the motion detection may be included in a photoresistor sensor or a DVS and the face detection module 150 may be included in the image sensor 100c.

In an embodiment, the face detection module 150 may be included inside the control circuit 110. In this case, the control circuit 110 may sequentially perform the motion detection operation and the face detection operation.

Figure 9:
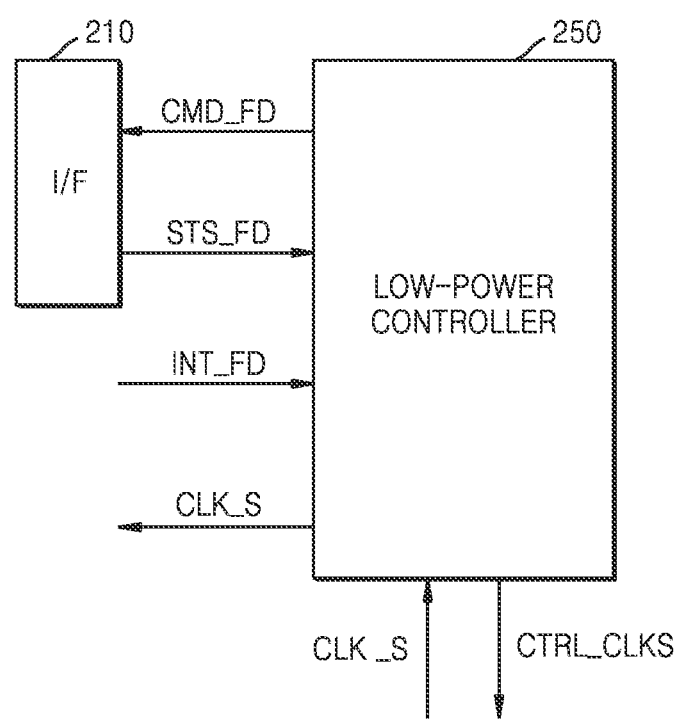
FIG. 9 is a block diagram of a portion of a processor, according to an example embodiment.

FIG. 9 is a block diagram of a portion of the processor 200c, according to an example embodiment.

The processor 200c of FIG. 9 may illustrate a modified embodiment of the processor 200b. Accordingly, duplicate descriptions with reference to FIG. 6 will be omitted. The processor 200c of FIG. 9 may not directly perform the face detection operation, and accordingly, generated signals may be changed.

Referring to FIG. 9, the low-power controller 250 may generate the face detection command CMD_FD and provide the face detection command CMD_FD to the image sensor (100c of FIG. 8) via the I/F_210.

In response to the face detection command CMD_FD, the image sensor 100c may perform the face detection operation, and when the face detection operation is completed, may generate the second interrupt signal INT_FD. By receiving the second interrupt signal INT_FD, the processor 200c may read the second status information STS_FD stored in the status register 120 of the image sensor 100c. The second status information STS_FD may indicate whether the face detection succeeds. The second status information STS_FD may be provided to the low-power controller 250 via the I/F_210.

On the other hand, to receive the second interrupt signal INT_FD, the processor 200c may include an I/F corresponding to the IF_2 140 of the image sensor 100c. The I/F may include, for example, GPIO.

Because the second interrupt signal INT_FD means completion of the face detection operation of the image sensor 100c, the low-power controller 250 may block the clock signal CLK_S provided to the image sensor 100c by receiving the second interrupt signal INT_FD. Generation of the clock signal CLK_S may be blocked by transmitting the clock control signal CTRL_CLKS of the first level to the clock generator 300, which generates the clock signal CLK_S.

Figure 10:
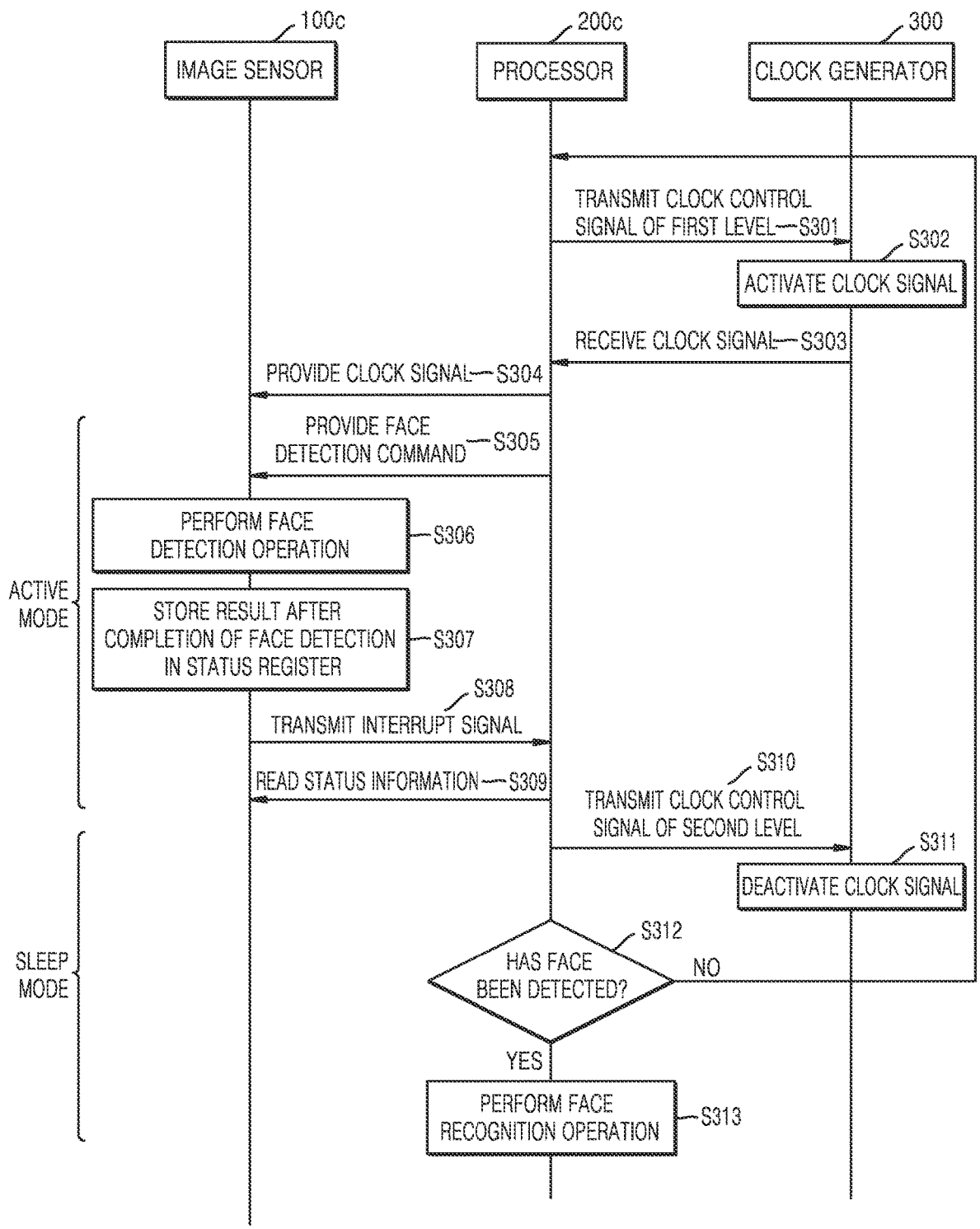
FIG. 10 is a flowchart of an operation of an image processing device, according to an example embodiment.

FIG. 10 is a flowchart of an operation of an image processing device, according to an example embodiment. The image processing device 10 may include the image sensor 100c of FIG. 8 and the processor 200c of FIG. 9 and may perform the face detection operation.

Referring to FIG. 10, the processor 200c may transmit the clock control signal CTRL_CLKS of the first level to the clock generator 300 (S301). For example, the first level may be logic high level. In this manner, the clock generator 300 may activate the clock signal CLK_S (S302).

The processor 200c may receive the clock signal CLK_S from the clock generator 300 (S303) and may provide the clock signal CLK_S to the image sensor 100c (S304). When the clock signal CLK_S is provided to the image sensor 100c, the operation mode of the image sensor 100c may be set to the active mode.

Because the image sensor 100c includes the face detection module 150, the processor 200c may generate the face detection command CMD_FD and provide the face detection command CMD_FD to the image sensor 100c (S305), and the image sensor 100c may perform the face detection operation (S306).

When the face detection operation is completed, the image sensor 100c may store a face detection result in the status register 120 (S307). The second status information STS_FD stored in the status register 120 may include the face detection result and the operation mode of the image sensor 100.

In addition, when the face detection operation is terminated, the image sensor 100c may generate the second interrupt signal INT_FD and transmit the second interrupt signal INT_FD to the processor 200c (S308). The processor 200c may identify that the operation of the image sensor 100c has been terminated by using the second interrupt signal INT_FD.

The processor 200c may read the second status information STS_FD stored in the image sensor 100c (S309) and may transmit the clock control signal CTRL_CLKS of the second level to the clock generator 300 (S310). For example, the second level may be logic low level. The clock generator 300 may deactivate the clock signal CLK_S by blocking generation of the clock signal CLK_S (S311). When the clock signal CLK_S provided to the image sensor 100c is blocked, the operation mode of the image sensor 100c may be set to the sleep mode.

Thereafter, the processor 200c may identify whether the face detection has been made, based on the received second status information STS_FD (S312). When a face has been detected, an operation of face recognition may be performed as a next operation (S313). When a face has not been detected, operation S301 may be performed again.

Figure 11:
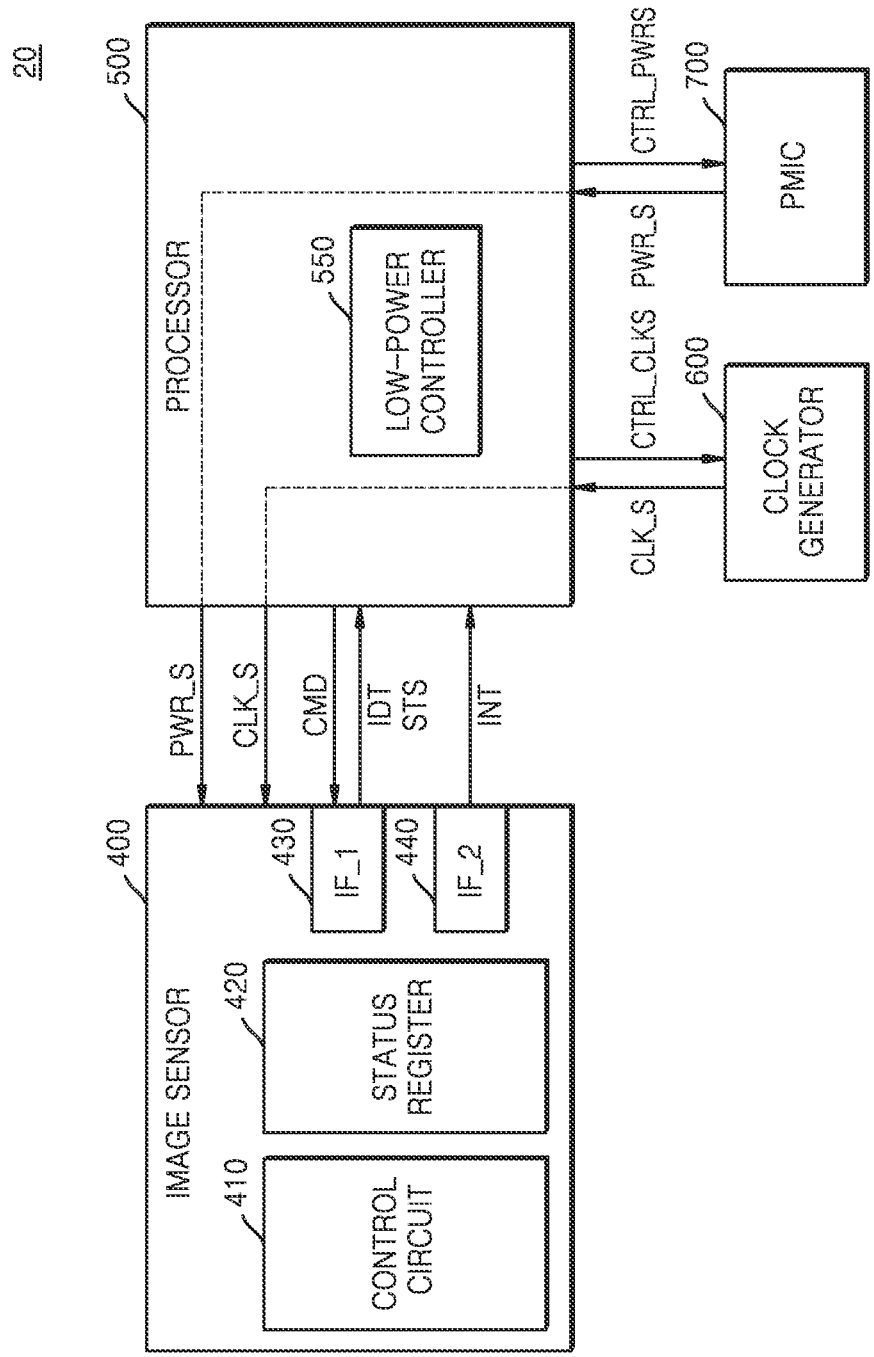
FIG. 11 is a block diagram of an image processing device according to an example embodiment.

FIG. 11 is a block diagram of an image processing device 20 according to an example embodiment. The image processing device 20 may include a image sensor 400 and a processor 500. The image sensor 400 may include a control circuit 410, a status register 420, a first interface circuit (I/F_1) 430, and a second interface circuit (I/F_2) 440. Accordingly, duplicate descriptions of the image sensor 100 in FIG. 1 will be omitted.

According to an embodiment, a processor 500 may implement a low power operation of an image sensor 400 by controlling not only the clock signal CLK_S but a power signal PWR_S provided to the image sensor 400. The processor 500 may identify that an operation of the image sensor 400 has been completed and may block the clock signal CLK_S and the power signal PWR_S provided to the image sensor 400. Hereinafter, duplicate descriptions with reference to FIG. 1 will be omitted.

Referring to FIG. 11, an image processing device 20 may further include a PMIC 700. The PMIC 700 may generate the power signal PWR_S that is input to the processor 500 and the image sensor 400. For example, the power signal PWR_S may be a power voltage.

The PMIC 700 may generate the power signal PWR_S provided to the image sensor 400. The PMIC 700 may also generate various clock signals used by the image processing device 20. For example, the PMIC 700 may generate the power signal provided to the processor 500.

The power signal PWR_S generated by the PMIC 700 may be provided to the image sensor 400 via the processor 500. The PMIC 700 may generate the power signal PWR_S provided to the image sensor 400 according to a power control signal CTRL_PWRS of the processor 500. In an embodiment, according to the power control signal CTRL_PWRS of the first level, the PMIC 700 may not generate the power signal PWR_S or may not transmit the power signal PWR_S to the processor 500. For example, the first level may be logic low level. In addition, the PMIC 700 may transmit the power signal PWR_S to the processor 500 according to the power control signal CTRL_PWRS of the second level. For example, the second level may be logic high level. Below, blocking the power signal PWR_S by the processor 500 by transmitting the power control signal CTRL_PWRS of the first level to the PMIC 700 may be referred to as turning off the power signal PWR_S. In addition, generating the power signal PWR_S by the processor 500 by transmitting the power control signal CTRL_PWRS of the second level to the PMIC 700 may be referred to as turning on the power signal PWR_S.

The image processing device 20 may selectively provide power to the image sensor 400 by controlling the power signal PWR_S provided to the image sensor 400 based on signals received from the image sensor 400, for example, an interrupt signal and/or the image data IDT. Accordingly, because the power is not provided when the image sensor 400 does not operate, power consumption may be reduced.

Figure 12:
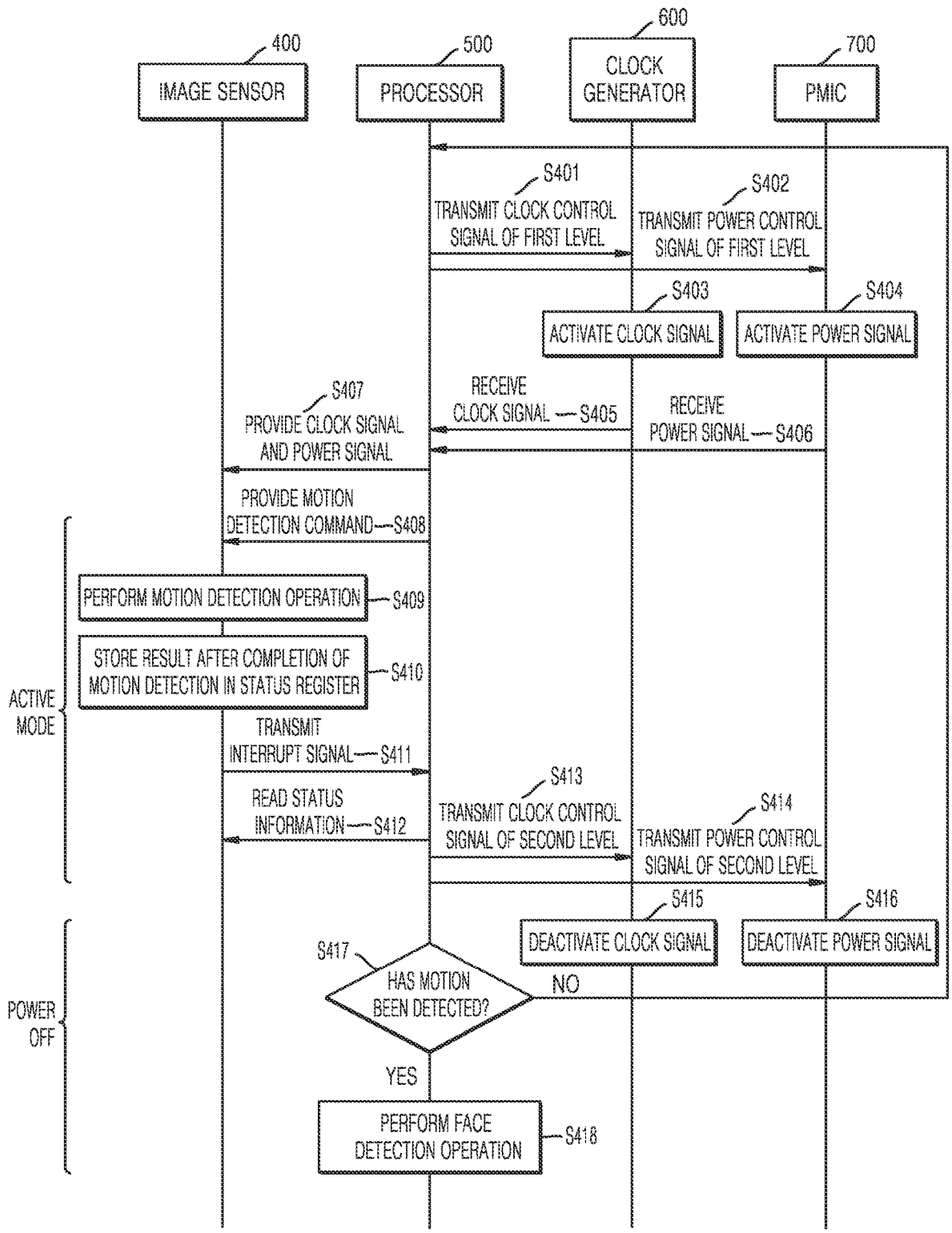
FIG. 12 is a flowchart of an operation of an image processing device, according to an example embodiment.
Figure 13:
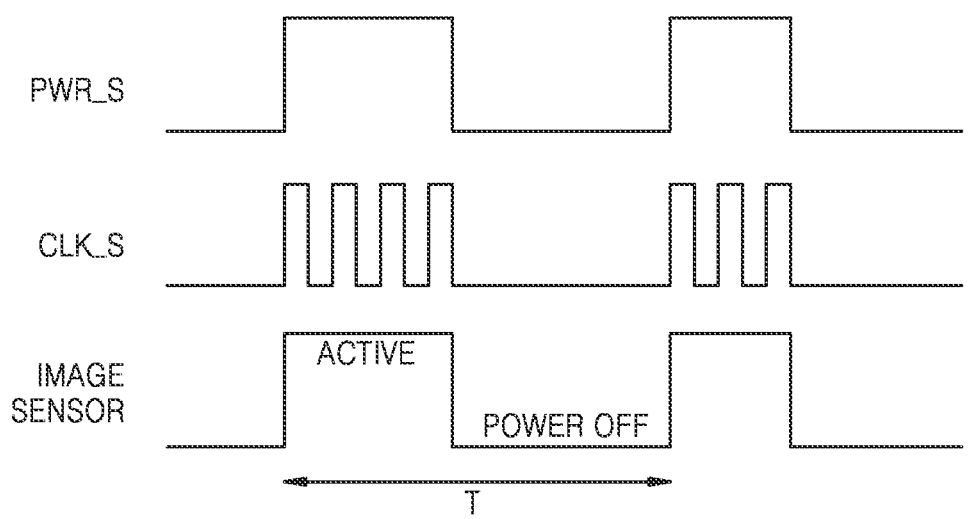
FIG. 13 is a timing diagram of an operation mode of an image sensor, according to an example embodiment.

FIG. 12 is a flowchart of an operation of the image processing device 20, according to an example embodiment, and FIG. 13 is a timing diagram of an operation mode of the image sensor 400, according to an example embodiment. The operations of the image processing device 20 may be similar to the operations in FIG. 4, and thus, duplicate descriptions thereof will be omitted.

Referring to FIGS. 11 and 12, the processor 500 may transmit the clock control signal CTRL_CLKS to a clock generator 600 (S401) and may transmit the power control signal CTRL_PWRS of the first level to the PMIC 700 (S402). Accordingly, the clock generator 600 may activate the clock signal CLK_S (S403) and the PMIC 700 may activate the power signal PWR_S (S404).

The processor 500 may receive the clock signal CLK_S (S405), may receive the power signal PWR_S (S406), and may provide the clock signal CLK_S and the power signal PWR_S to the image sensor 400 (S407). Operations S401 and S402 may be simultaneously performed, or operation S402 may be performed in advance and then, operation S401 may be performed. In addition, operations S405 and S406 may be simultaneously performed, or operation S406 may be performed in advance and then operation S405 may be performed. In this case, referring to FIG. 13, when the image sensor 400 receives the clock signal CLK_S and the power signal PWR_S, the mode of the image sensor 400 may be changed from the power off mode to the active mode.

Thereafter, the processor 500 may generate the motion detection command CMD_MD and provide the motion detection command CMD_MD to the image sensor 400 for performing the motion detection operation (S408), and the image sensor 400 may perform the motion detection operation (S409). When the motion detection operation is completed, the image sensor 400 may generate the first status information STS_MD, including the motion detection result, and store the first status information STS_MD in the status register 420 (S410). In addition, the image sensor 400 may generate the first interrupt signal INT_MD indicating completion of the motion detection operation and transmit the first interrupt signal INT_MD to the processor 500 (S411).

The processor 500 may receive the first interrupt signal INT_MD and read the first status information STS_MD stored in the image sensor 400 (S412). Thereafter, the operation of the image sensor 400 may be determined as being completed and the image sensor 400 may be turned off. The processor 500 may transmit the clock control signal CTRL_CLKS of the second level to the clock generator 600 (S413) and may transmit the power control signal CTRL_PWRS of the second level to the PMIC 700 (S414). Accordingly, the clock generator 600 may deactivate the clock signal CLK_S (S415) and the PMIC 700 may deactivate the power signal PWR_S (S416). Operations S413 and S414 may be simultaneously performed, or operation S414 may be performed in advance and then, operation S413 may be performed. When the clock signal CLK_S and the power signal PWR_S are blocked, the operation mode of the image sensor 400 may be set to the power off mode.

Thereafter, the processor 500 may identify whether the face detection has been made, based on the received first status information STS_MD (S417). When a motion has been detected, an operation of face detection may be performed as a next operation (S418). When a motion has not been detected, operation S401 may be performed again. Operations S401 through S417 may be performed repeatedly according to the period T.

Figure 14:
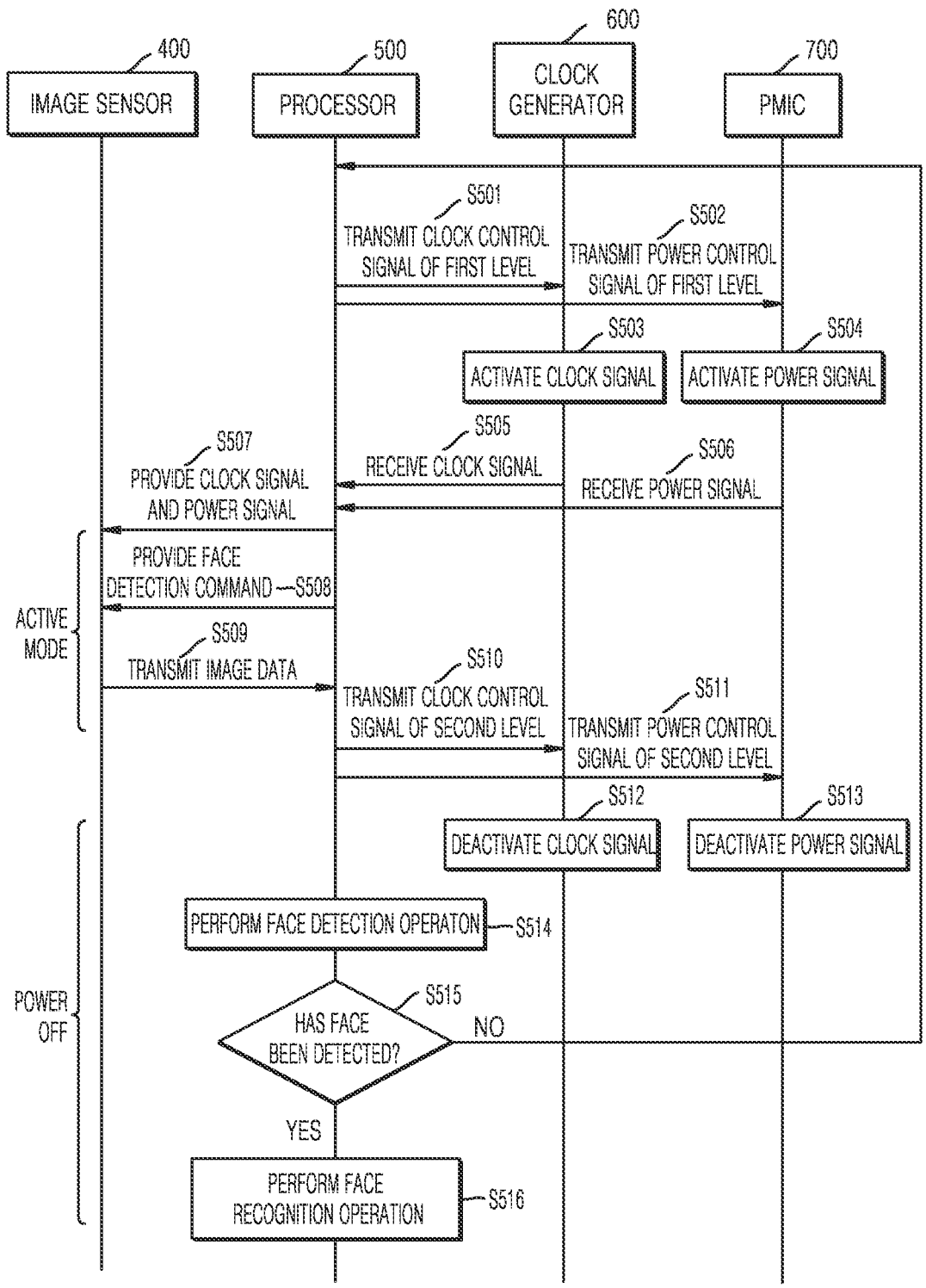
FIG. 14 is a flowchart of an operation of an image processing device, according to an example embodiment.

FIG. 14 is a flowchart of an operation of the image processing device 20, according to an example embodiment. Operations in FIG. 14 may include the face detection operation corresponding to operation S418 in FIG. 13. The processor 500 may include a face detection module (not illustrated). The operation of the image processing device 20 may be similar to operations in FIG. 7, and duplicate descriptions thereof may be omitted.

Referring to FIG. 14, the processor 500 may transmit the clock control signal CTRL_CLKS of the first level to the clock generator 600 (S501) and may transmit the power control signal CTRL_PWRS of the first level to the PMIC 700 (S502). Accordingly, the clock generator 600 may activate the clock signal CLK_S (S503) and the PMIC 700 may activate the power signal PWR_S (S504).

The processor 500 may receive the clock signal CLK_S (S505), may receive the power signal PWR_S (S506), and may provide the clock signal CLK_S and the power signal PWR_S to the image sensor 400 (S507). Operations S501 and S502 may be simultaneously performed or a sequence thereof may be changed. In addition, operations S505 and S506 may be simultaneously performed or a sequence thereof may be changed. When the image sensor 400 receives the clock signal CLK_S and the power signal PWR_S, the mode of the image sensor 400 may be changed from the power off mode to the active mode.

To perform the face detection operation, the processor 500 may generate the face detection command CMD_FD and provide the face detection command CMD_FD to the image sensor 400 (S508). The image sensor 400 may generate the image data IDT and transmit the image data IDT to the processor 500 in response to the face detection command CMD_FD (S509).

The processor 500 may identify that the operation of the image sensor 400 has been terminated, by receiving the image data IDT, and may transmit the clock control signal CTRL_CLKS of the second level to the clock generator 600 (S510) and may transmit the power control signal CTRL_PWRS of the second level to the PMIC 700 (S511).

The clock generator 600 may deactivate the clock signal CLK_S (S512), and the PMIC 700 may deactivate the power signal PWR_S (S513). Accordingly, the image sensor 400 may be set to the power off mode. In other words, because the image processing device 20 generates the clock signal CLK_S and the power signal PWR_S only in a period in which the image sensor 400 generates the image data IDT, consumed power may be reduced by discontinuing a clock signal and power in a period in which the image sensor 400 does not operate.

The processor 500 may perform the face detection operation based on the received image data IDT (S514). When a face is detected (S515), the face recognition operation may be performed (S516). When a face is not detected (S515), operation S501 may be performed again.

Figure 15:
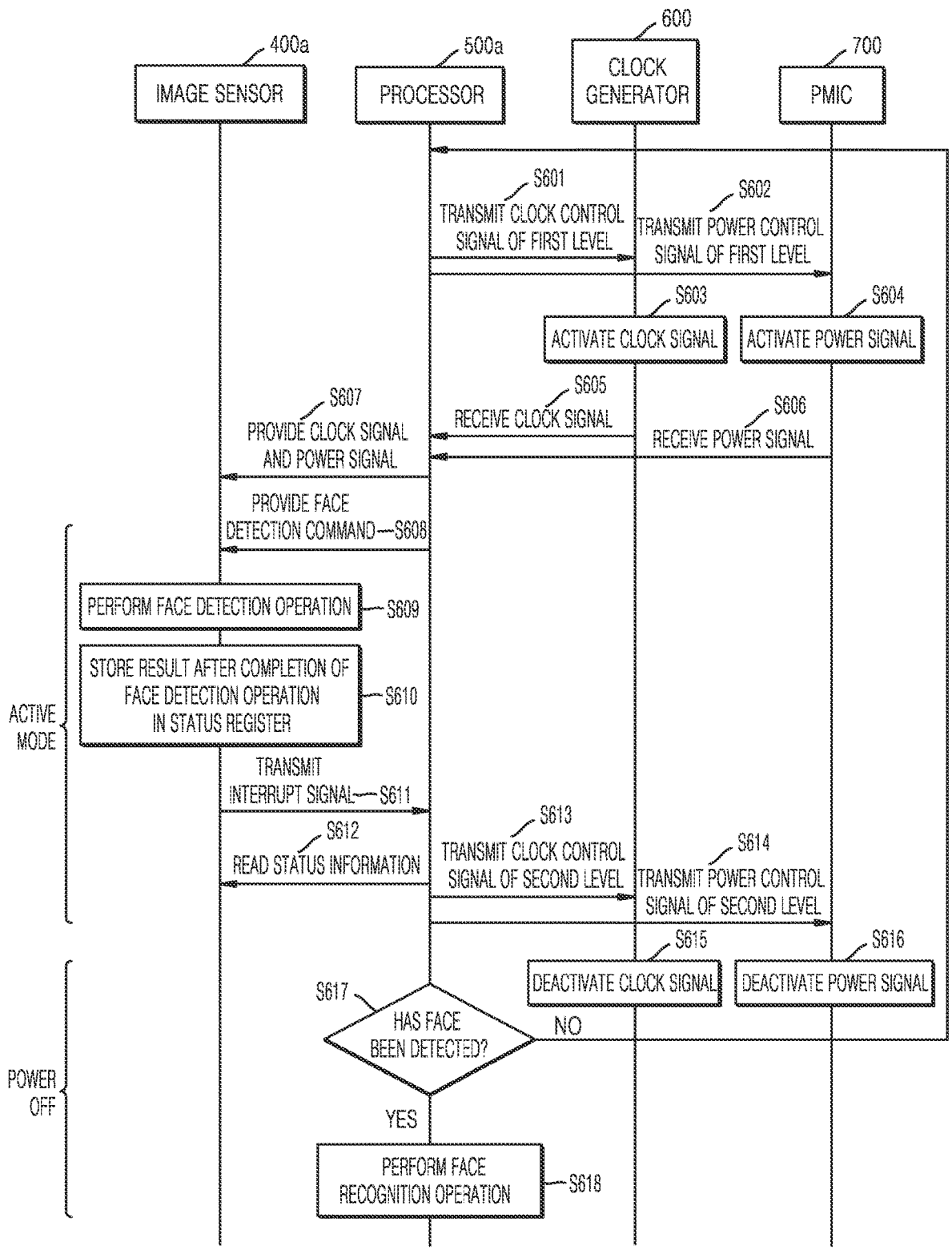
FIG. 15 is a flowchart of an operation of an image processing device, according to an example embodiment.

FIG. 15 is a flowchart of an operation of an image processing device, according to an example embodiment.

On the other hand, the face detection operation may be performed by an image sensor 400a. The image sensor 400a may mean that a face detection module (not illustrated) is included in the image sensor 400 in FIG. 11. Operations in FIG. 15 may be similar to operations in FIG. 10.

Referring to FIG. 15, a processor 500a may transmit the clock control signal CTRL_CLKS of the first level to the clock generator 600 (S601) and may transmit the power control signal CTRL_PWRS of the first level to the PMIC 700 (S602). Accordingly, the clock generator 600 may activate the clock signal CLK_S (S603) and the PMIC 700 may activate the power signal PWR_S (S604).

The processor 500 may receive the clock signal CLK_S (S605), may receive the power signal PWR_S (S606), and may provide the clock signal CLK_S and the power signal PWR_S to the image sensor 400 (S607). In operation S607, the image sensor 400a may be set to the active mode. The sequence of operations S601 and S602 is not be limited thereto, and the sequence of operations S605 and S606 is not limited thereto.

To perform the face detection operation, the processor 500a may generate the face detection command CMD_FD and provide the face detection command CMD_FD to the image sensor 400a (S608). The image sensor 400a may directly perform the face detection operation (S609) and may store the second status information STS_FD, which has been generated as a result thereof, to the status register 420 (S610). When the face detection operation is completed, the image sensor 400a may generate the second interrupt signal INT_FD and transmit the second interrupt signal INT_FD to the processor 500a (S611). The processor 500a may read the second status information STS_FD stored in the image sensor 400a (S612).

In addition, the processor 500 may identify that the operation of the image sensor 400a has been terminated by using the second interrupt signal INT_FD, may transmit the clock control signal CTRL_CLKS of the second level to the clock generator 600 (S613), and may transmit the power control signal CTRL_PWRS of the second level to the PMIC 700 (S614). The clock generator 600 may deactivate the clock signal CLK_S (S615), and the PMIC 700 may deactivate the power signal PWR_S (S616). In operation S616, the image sensor 400a may be set to the power off mode.

Thereafter, the processor 500a may identify whether the face detection has been made, based on the received second status information STS_FD (S617). When a face has been detected, an operation of face recognition may be performed as a next operation (S618). When a face has not been detected, operation S601 may be performed again.

Figure 16:
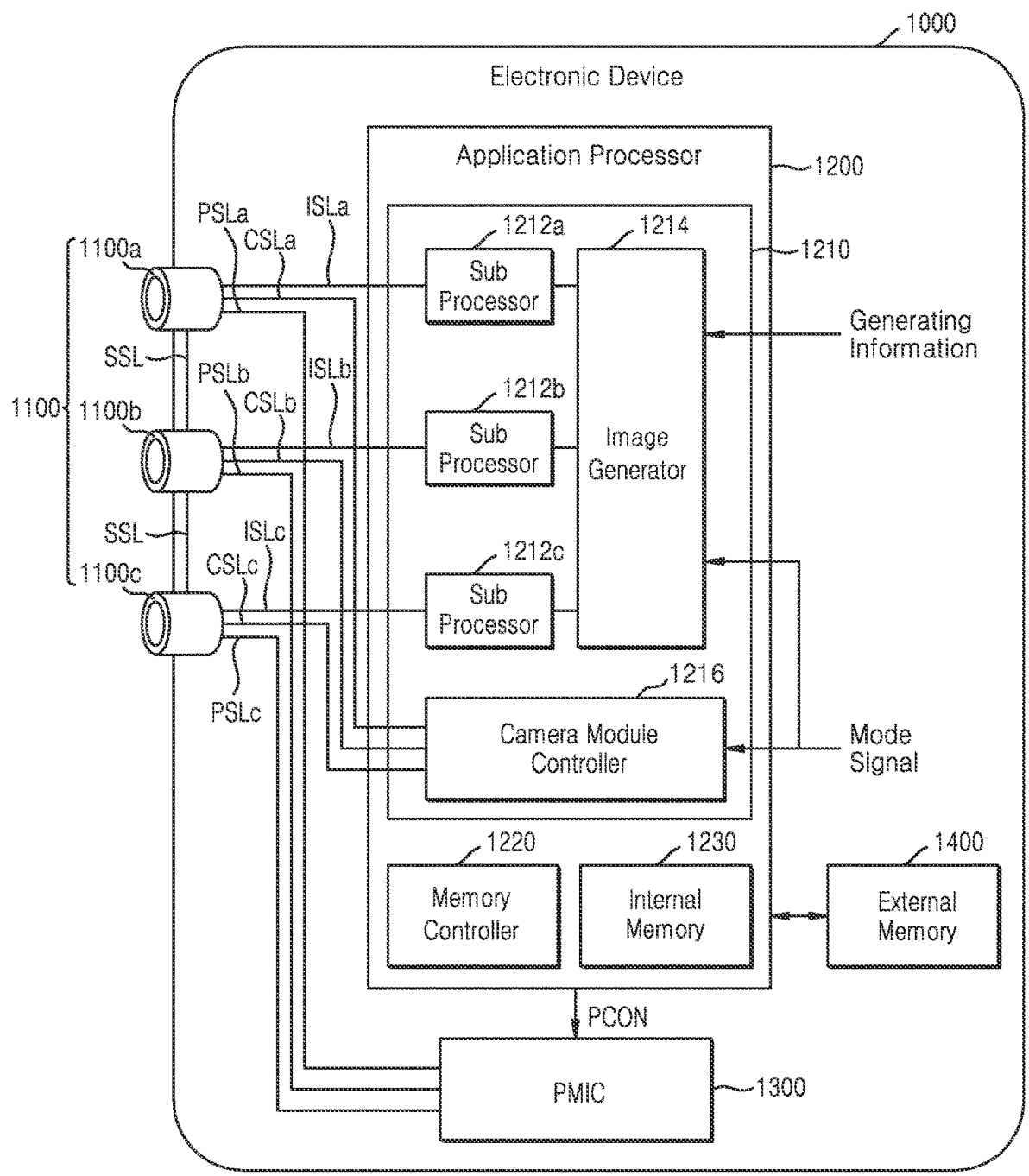
FIG. 16 is a block diagram of an electronic device including a multi-camera module.
Figure 17:
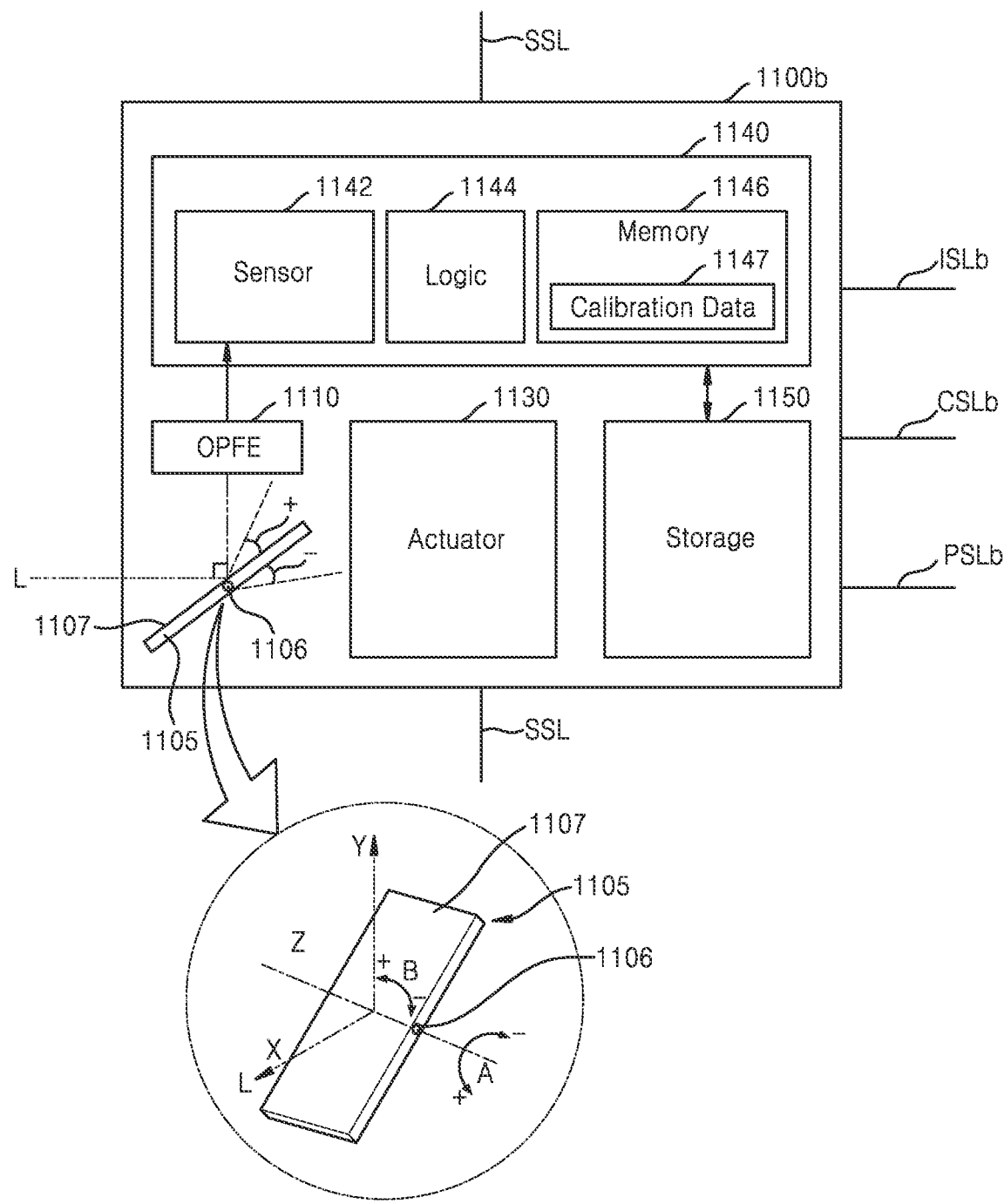
FIG. 17 is a detailed block diagram of a camera module in FIG. 10.

FIG. 16 is a block diagram of an electronic device 1000 including a multi-camera module 1100, according to an example embodiment. FIG. 17 is a detailed block diagram of a camera module 1100b in FIG. 16. Referring to FIG. 16, the electronic device 1000 may include the camera module group 1100, an application processor 1200, a PMIC 1300, and an external memory 1400.

The camera module group 1100 may include a plurality of camera modules 1100a, 1100b, and 1100c. Although the drawing illustrates an embodiment in which three camera modules 1100a, 1100b, and 1100c are arranged, the embodiment is not limited thereto. In some embodiments, the camera module group 1100 may be modified to include only two camera modules. In addition, in some embodiments, the camera module group 1100 may be modified and embodied to include n (n is a natural number equal to or greater than 4) camera modules.

Hereinafter, referring to FIG. 17, detailed configurations of the camera module 1100b will be described, but the descriptions below may be identically applied to other camera modules 1100a and 1100c according to embodiments.

Referring to FIG. 17, the camera module 1100b may include a prism 1105, an optical path folding element (hereinafter, referred to as OPFE) 1110, an actuator 1130, and an image sensing device 1140, and a storage 1150.

The prism 1105 may change a path of light L incident from the outside by including a reflective surface 1107 of a light reflecting material.

In some embodiments, the prism 1105 may change a path of light L incident in a first direction X to a second direction Y perpendicular to the first direction X. In addition, the prism 1105 may rotate the reflective surface 1107 of the light reflecting material to a direction A with a center axis 1106 as a center or change the path of the light L incident in the first direction X to the second direction Y by rotating the center axis 1106 to a direction B. In this case, the OPFE 1110 may also be moved to a third direction Z perpendicular to the first direction X and the second direction Y.

In some embodiments, as illustrated, the maximum rotation angle in a direction A of the prism 1105 may be equal to or less than about 15 degrees in a plus (+) direction A and greater than about 15 degrees in a minus (−) direction A, but the embodiments are not limited thereto.

In some embodiments, the prism 1105 may be moved within about 20 degrees, between about 10 degrees and about 20 degrees, or between about 15 degrees and about 20 degrees in a plus (+) or minus (−) direction B; in this case, the movement degrees may be the same degrees in the plus (+) or the minus (−) direction B or almost similar degrees thereto within a range of about 1 degree.

In some embodiments, the prism 1105 may move the reflecting surface 1107 to a third direction (for example, the Z direction) in parallel with an extended direction of the center axis 1106.

The OPFE 1110 may include, for example, an optical lens including m (m is a natural number) groups. The m lenses may move in the second direction Y and change an optical zoom ratio of the camera module 1100b. For example, when a basic optical zoom ratio of the camera module 1100b is defined as Z and m groups included in the OPFE 1110 are moved, the optical zoom ratio of the camera module 1100b may be changed to an optical zoom ratio of 3Z or 5Z or 5Z or more.

The actuator 1130 may move the OPFE 1110 or the optical lens (hereinafter, referred to as an optical lens) to a certain position. For example, the actuator 1130 may adjust a location of the optical lens so that the image sensor 1142 is positioned at a focal length of the optical lens for an accurate sensing.

The image sensing device 1140 may include a sensor, for example image sensor 1142, a logic, for example control logic 1144, and a memory 1146. The image sensor 1142 may sense an image of a sensing object by using the light L provided through the optical lens. The control logic 1144 may control the overall operation of the camera module 1100b. For example, the control logic 1144 may control an operation of the camera module 1100b according to a control signal provided via a control signal line CSLb.

The memory 1146 may store information required for operations of the camera module 1100b, such as calibration data 1147. The calibration data 1147 may include information required by the camera module 1100 for generating image data by using the light L provided from the outside. The calibration data 1147 may include, for example, information about the degree of rotation described above, information about a focal length, information about an optical axis, etc. When the camera module 1100b is implemented in a multi-state camera type in which a focal length varies according to a position of the optical lens, the calibration data 1147 may include information about a focal length value per position (or per state) of the optical lens and information about auto-focusing.

The storage 1150 may store the image data sensed by the image sensor 1142. The storage 1150 may be arranged outside the image sensing device 1140 and may be implemented in a form in which the storage 1150 is stacked with a sensor chip constituting the image sensing device 1140. In some embodiments, the storage 1150 may be implemented as an electrically erasable programmable read-only memory (EEPROM), but the embodiments are not limited thereto.

Referring to FIGS. 16 and 17 together, in some embodiments, each of the plurality of camera modules 1100a, 1100b, and 1100c may include the actuator 1130. Accordingly, each of the plurality of camera modules 1100a, 1100b, and 1100c may include identical or different calibration data 1147 to or from each other, according to an operation of the actuator 1130 included therein.

In some embodiments, one camera module (for example, 1100b) of the plurality of camera modules 1100a, 1100b, and 1100c may include a folded lens-type camera module including the prism 1105 and the OPFE 1110 described above and the remaining camera modules (for example, 1100a and 1100c) may include a vertical-type camera module that does not include the prism 1105 and the OPFE 1110, but the embodiments are not limited thereto.

In some embodiments, one camera module (for example, 1100c) of the plurality of camera modules 1100a, 1100b, and 1100c may include a depth camera of a vertical type in which depth information is extracted by using, for example, an infrared ray (IR). In this case, the application processor 1200 may generate a three-dimensional (3D) depth image by merging image data provided by the depth camera with image data provided by another camera module (for example, 1100a or 1100b).

In some embodiments, at least two camera modules (for example, 1100a and 1100b) of the plurality of camera modules 1100a, 1100b, and 1100c may have different fields of view from each other. In this case, for example, the optical lenses of at least two camera modules (for example, 1100a and 1100b) of the plurality of camera modules 1100a, 1100b, and 1100c may be different from each other, but the embodiments are not limited thereto.

In addition, in some embodiments, the fields of view of each of the plurality of camera modules 1100a, 1100b, and 1100c may be different from each other. In this case, the optical lenses included in each of the plurality of camera modules 1100a, 1100b, and 1100c may also be different from each other, but the embodiments are not limited thereto.

In some embodiments, each of the plurality of camera modules 1100a, 1100b, and 1100c may be arranged physically apart from each other. In other words, a sensing area of one image sensor 1142 may not be divided and used by the plurality of camera modules 1100a, 1100b, and 1100c, but the image sensor 1142 may be arranged independently inside each of the plurality of camera modules 1100a, 1100b, and 1100c.

Referring again to FIG. 16, the application processor 1200 may include an image processing device 1210, a memory controller 1220, and an internal memory 1230. The application processor 1200 may be implemented separate from the plurality of camera modules 1100a, 1100b, and 1100c. For example, the application processor 1200 and the plurality of camera modules 1100a, 1100b, and 1100c may be implemented as being separated from each other in separate semiconductor chips.

The image processing device 1210 may include a plurality of sub-image processors 1212a, 1212b and 1212c, an image generator 1214, and a camera module controller 1216.

The image processing device 1210 may include the plurality of sub-image processors 1212a, 1212b, and 1212c having the number thereof corresponding to the number of the plurality of camera modules 1100a, 1100b, and 1100c.

Image data generated by each of the plurality of camera modules 1100a, 1100b, and 1100c may be provided to the corresponding plurality of sub-image processors 1212a, 1212b, and 1212c via image signal lines ISLa, ISLb, and ISLc, which are separate from each other. For example, the image data generated by the camera module 1100a may be provided to the sub-image processor 1212a via the image signal line ISLa, the image data generated by the camera module 1100b may be provided to the sub-image processor 1212b via the image signal line ISLb, and the image data generated by the camera module 1100c may be provided to the sub-image processor 1212c via the image signal line ISLc. Transmission of the image data may be performed by using, for example, a camera serial interface (CSI) based on a mobile industry processor interface (MIPI), but the embodiments are not limited thereto.

On the other hand, in some embodiments, one sub-image processor may be arranged to correspond to a plurality of camera modules. For example, the sub-image processor 1212a and the sub-image processor 1212c may not be implemented as separate from each other as illustrated but may be implemented as integrated into one sub-image processor and the image data provided by the camera module 1100a and the camera module 1100c may, after being selected by a select element (for example, a multiplexer), be provided to the integrated sub-image processor.

The image data provided to each of the plurality of sub-image processors 1212a, 1212b, and 1212c may be provided to the image generator 1214. The image generator 1214 may generate an output image by using the image data provided by each of the plurality of sub-image processors 1212a, 1212b, and 1212c according to image generating information or a mode signal.

The image generator 1214 may generate an output image by merging at least some of the image data generated by the plurality of camera modules 1100a, 1100b, and 1100c having different fields of view from each other, according to the image generation information or the mode signal. In addition, the image generator 1214 may generate an output image by selecting at least one of the image data generated by the plurality of camera modules 1100a, 1100b, and 1100c having different fields of view from each other, according to the image generation information or the mode signal.

In some embodiments, the image generating information may include a zoom signal or a zoom factor. In addition, in some embodiments, the mode signal may include, for example, a signal based on a mode selected by a user.

When the image generating information includes the zoom signal (zoom factor) and each of the plurality of camera modules 1100a, 1100b, and 1100c has different fields of view from each other, the image generator 1214 may perform different operations from each other according to a type of the zoom signal. For example, when the zoom signal includes the first signal, after merging the image data output by the camera module 1100a with the image data output by the camera module 1100c, the image generator 1214 may generate an output image by using the image data output by the camera module 1100b which has not been used in the merging with the merged image signal. When the zoom signal includes the second signal different from the first signal and the second signal, the image generator 1214 may not perform merging of the image data, but may generate the output image by selecting any one of the image data output by each of the plurality of camera modules 1100a, 1100b, and 1100c. However, the embodiments are not limited thereto, and a method of processing the image data may be modified and performed as necessary.

In some embodiments, by receiving a plurality of image data having different exposure times from each other from at least one of the plurality of sub-image processors 1212a, 1212b, and 1212c and performing a high dynamic range (HDR) processing on the plurality of image data, the image generator 1214 may generate the merged image data with an increased dynamic range.

The camera module controller 1216 may provide a control signal to each of the plurality of camera modules 1100a, 1100b, and 1100c. The control signal generated by the camera module controller 1216 may be provided to the corresponding plurality of camera modules 1100a, 1100b, and 1100c via control signal lines CSLa, CSLb, and CSLc, which are separated from each other, respectively.

Any one of the plurality of camera modules 1100a, 1100b, and 1100c may be designated as a master camera (for example, 1100b) according to the image generating information including the zoom signal or the mode signal, and the other camera modules (for example, 1100a and 1100c) may be designated as slave cameras. This piece of information may be included in the control signal and may be provided to the corresponding plurality of camera modules 1100a, 1100b, and 1100c via the control signal lines CSL1, CSLb, and CSLc, which are separated from each other, respectively.

According to the zoom factor or an operation mode signal, camera modules operating as the master camera or the slave cameras may be changed. For example, when the field of view of the camera module 1100a is wider than the field of view of the camera module 1100b and indicates a zoom ratio having a low zoom factor, the camera module 1100b may operate as the master camera and the camera module 1100a may operate as the slave camera. To the contrary, when the field of view indicates a zoom ratio having a high zoom ratio, the camera module 1100a may operate as the master camera and the camera module 1100b may operate as the slave camera.

In some embodiments, the control signal provided by the camera module controller 1216 to each of the plurality of camera modules 1100a, 1100b, and 1100c may include a sync enable signal. For example, when the camera module 1100b is the master camera and the camera modules 1100a and 1100c are the slave cameras, the camera module controller 1216 may transmit the sync enable signal to the camera module 1100b. The camera module 1100b having received the sync enable signal may generate a sync signal based on the received sync enable signal and provide the generated sync signal to the camera modules 1100a and 1100c via a sync enable signal line SSL. The camera module 1100b and the camera modules 1100a and 1100c may be synchronized to the sync signal and transmit the image data to the application processor 1200.

In some embodiments, the control signal provided by the camera module controller 1216 to the plurality of camera modules 1100a, 1100b, and 1100c may include mode information according the mode signal. Based on the mode information, the plurality of camera modules 1100a, 1100b, and 1100c may operate in a first operation mode and second operation mode with respect to a sensing speed.

The plurality of camera modules 1100a, 1100b, and 1100c may, in the first operation mode, generate the image signal at a first speed (for example, generate the image signal at a first frame rate), encode the image signal at a second speed higher than the first speed (for example, encode the image signal at a second frame rate greater than the first frame rate), and transmit the encoded image signal to the application processor 1200. In this case, the second speed may be equal to or less than about 30 times the first speed.

The application processor 1200 may store the received image signal, that is, the encoded image signal, in the internal memory 1230 equipped therein or the storage 1400 outside the application processor 1200 and then read and decode the encoded signal from the internal memory 1230 or the storage 1400 and may display the image data generated based on the decoded image signal. For example, a corresponding sub-processor of the plurality of sub-processors 1212a, 1212b, and 1212c of the image processing device 1210 may perform decoding and in addition, may perform image processing on the decoded image signal.

The plurality of camera modules 1100a, 1100b, and 1100c may, in the second operation mode, generate the image signal at a third speed lower than the first speed (for example, generate the image signal at a third frame rate less than the first frame rate) and transmit the image signal to the application processor 1200. The image signal provided to the application processor 1200 may include an un-encoded signal. The application processor 1200 may perform the image processing on the received image signal or store the received image signal in the internal memory 1230 or the storage 1400.

The PMIC 1300 may provide power, for example, a power voltage to each of the plurality of camera modules 1100a, 1100b, and 1100c. For example, the PMIC 1300 may, under the control of the application processor 1200, provide a first power to the camera module 1100a via a power signal line PSLa, provide a second power to the camera module 1100b via a power signal line PSLb, and provide a third power to the camera module 1100c via a power signal line PSLc.

The PMIC 1300 may, in response to a power control signal PCON from the application processor 1200, generate power corresponding to each of the plurality of camera modules 1100a, 1100b, and 1100c and, in addition, may adjust a level of the generated power. The power control signal PCON may include a power adjustment signal per operation mode of the plurality of camera modules 1100a, 1100b, and 1100c. For example, the operation mode may include a low power mode and, in this case, the power control signal PCON may include information about a camera module operating at the low power mode and information about a set power level. The levels of power provided to each of the plurality of camera modules 1100a, 1100b, and 1100c may be identical to or different from each other. In addition, the level of power may be dynamically changed.

As described above with reference to FIGS. 1 through 15, the application processor 1200 may identify the operation statuses of the plurality of camera modules 1100a, 1100b, and 1100c. When the operation has been completed, the application processor 1200 may generate the power control signal PCON for blocking power provided to the plurality of camera modules 1100a, 1100b, and 1100c.

The electronic device 1000 may further include a clock generator (not illustrated). The clock generator may correspond to the clock generator described above (300 in FIG. 1, and 600 in FIG. 11) with reference to FIGS. 1 through 15. The clock generator may provide a clock signal (CLK_S in FIG. 1) to the plurality of camera modules 1100a, 1100b, and 1100c according to a control of the application processor 1200. In other words, the application processor 1200 may identify the operation status of the plurality of camera modules 1100a, 1100b, and 1100c and when the operation has been completed, may generate a clock control signal (CTRL_CLKS in FIG. 1) for blocking the clock signal CLK_S provided to the plurality of camera modules 1100a, 1100b, and 1100c.

Figure 18:
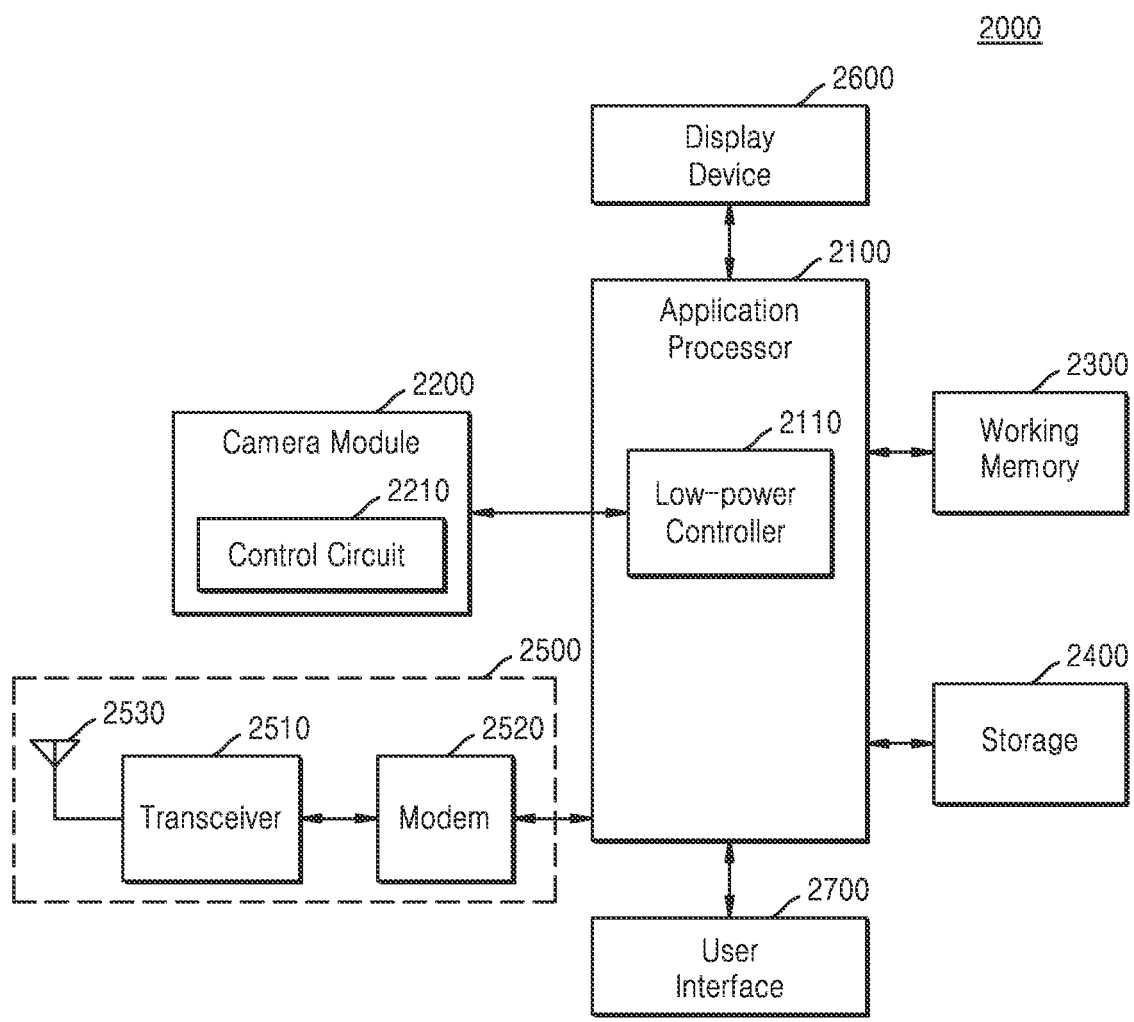
FIG. 18 is a schematic block diagram of an electronic device according to an example embodiment.

FIG. 18 is a schematic block diagram of an electronic device 2000 according to an example embodiment. The electronic device 2000 of FIG. 18 may include a mobile terminal.

Referring to FIG. 18, the electronic device 2000 may include an application processor 2100, a camera module 2200, a working memory 2300, a storage 2400, a display device 2600, a user interface 2700, and a wireless transceiver 2500.

The application processor 2100 may control the overall operation of the electronic device 2000 and may be implemented as a system on chip (SoC) driving application programs, operating systems, etc. The application processor 2100 may provide the image data provided by the camera module 2200 to the display device 2600 or store the image data in the storage 2400. The application processor 2100 may include a low-power controller 2110 controlling low-power implementation of the camera module 2200.

A processor described with reference to FIGS. 1 through 15 may correspond to the application processor 2100 and an image sensor may be applied to the camera module 2200. The camera module 2200 may include a control circuit 2210, and the control circuit 2210 may generate an interrupt signal indicating completion of an operation of the camera module 2200 and transmit the interrupt signal to the application processor 2100. The application processor 2100 may identify an operation status of the camera module 2200 based on the interrupt signal and may control a clock signal and a power signal provided to the camera module 2200.

The working memory 2300 may be implemented as a volatile memory, such as dynamic random access memory (RAM) (DRAM) and static RAM (SRAM), or a resistive non-volatile memory, such as ferroelectric RAM (FeRAM), resistive RAM (RRAM), and phase change RAM (RRAM). The working memory 2300 may store programs and/or data, which the application processor 2100 executes or processes.

The storage 2400 may be implemented as a non-volatile memory, such as, a NAND flash memory and resistive memory, and the storage 2400 may be provided as, for example, a memory card (a multi-media card (MMC), an embedded MMC (eMMC), a secure card (SD), and a micro SD), etc. The storage 2400 may store image data received from the camera module 2200 or data processed or generated by the application processor 2100.

The user interface 2700 may be implemented as various devices capable of receiving a user input, such as a keyboard, a curtain key panel, a touch panel, a finger-print sensor, and a microphone. The user interface 2700 may receive the user input and provide to the application processor 2100 a signal corresponding to the received user input.

The wireless transceiver 2500 may include a transceiver 2510, a modem 2520, and an antenna 2530.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

While the disclosure has been particularly shown and described with reference to embodiments thereof, it will be understood that various changes in form and details may be made therein without departing from the spirit and scope of the following claims.

What is claimed is:

1. A sensor comprising:
   a processor;
   a control circuit configured to be set to a first operation mode in which an operation is prepared by receiving a clock signal and an operation command from the processor, wherein the control circuit is configured to generate a first signal including a result of an operation corresponding to the operation command, and a second signal indicating completion of the operation; and
   an interface circuit configured to transmit the first signal and the second signal to the processor, wherein
   the control circuit is further configured to be set to a second operation mode due to not receiving the clock signal, which is discontinued by control of the processor in response to a transmission of the second signal and
   wherein, after receipt of the second signal, the processor is configured to evaluate, based on the first signal, whether a motion of an object has been detected.

2. The sensor of claim 1, wherein:
   the interface circuit receives a motion detection command from the processor, and
   the control circuit, in response to the motion detection command, generates first status information indicating whether the motion detection operation is completed.

3. The sensor of claim 2, wherein the interface circuit:
   transmits the second signal to the processor, and
   transmits the first status information to the processor in response to a request of the processor, after transmission of the second signal.

4. The sensor of claim 2, wherein the interface circuit further comprises a face detection circuit that:
   when the motion of the object has been detected, receives a face detection command from the processor, and
   in response to the face detection command, detects a face of the object and generates second status information indicating whether the face has been detected.

5. The sensor of claim 4, wherein the interface circuit:
   transmits the second signal to the processor, and
   transmits the second status information to the processor in response to a request of the processor, after transmission of the second signal.

6. The sensor of claim 2, wherein:
   when the motion of the object has been detected, the interface circuit receives a face detection command from the processor, and
   the control circuit generates image data of the object in response to the face detection command.

7. The sensor of claim 1, wherein the interface circuit comprises: a first interface circuit configured to transmit the first signal to the processor; and
   a second interface circuit configured to transmit the second signal to the processor.

8. The sensor of claim 7, wherein the second signal comprises an interrupt signal.

9. The sensor of claim 7, wherein the second interface circuit comprises a general-purpose input/output (GPIO) pin.

10. The sensor of claim 1, wherein the control circuit is set to the first operation mode in response to receiving a power signal and the clock signal and is set to a third operation mode in response to not receiving the power signal and the clock signal.

11. The sensor of claim 1, wherein the sensor comprises an image sensor configured to generate image data based on an optical signal incident from outside.

* * * * *